US012315431B2

(12) United States Patent
Hu et al.

(10) Patent No.: US 12,315,431 B2
(45) Date of Patent: May 27, 2025

(54) DISPLAY PANEL AND DISPLAY DEVICE

(71) Applicant: Shanghai Tianma Microelectronics Co., Ltd., Shanghai (CN)

(72) Inventors: Yuqi Hu, Shanghai (CN); Jujian Fu, Shanghai (CN); Hao Ding, Shanghai (CN)

(73) Assignee: Shanghai Tianma Microelectronics Co., Ltd., Shanghai (CN)

( * ) Notice: Subject to any disclaimer, the term of this patent is extended or adjusted under 35 U.S.C. 154(b) by 42 days.

(21) Appl. No.: 18/212,054

(22) Filed: Jun. 20, 2023

(65) Prior Publication Data

US 2023/0335045 A1 Oct. 19, 2023

(30) Foreign Application Priority Data

Sep. 7, 2022 (CN) ......................... 202211090997.5

(51) Int. Cl.
*G09G 3/32* (2016.01)

(52) U.S. Cl.
CPC ....... *G09G 3/32* (2013.01); *G09G 2300/0408* (2013.01); *G09G 2300/043* (2013.01); *G09G 2300/0842* (2013.01); *G09G 2310/0245* (2013.01); *G09G 2310/08* (2013.01); *G09G 2320/0247* (2013.01)

(58) Field of Classification Search
None
See application file for complete search history.

(56) References Cited

U.S. PATENT DOCUMENTS

2020/0082768 A1* 3/2020 Oh ....................... G09G 3/3291

* cited by examiner

*Primary Examiner* — Christopher J Kohlman
(74) *Attorney, Agent, or Firm* — KDW Firm PLLC

(57) ABSTRACT

Provided display panel includes at least one pixel circuit and at least one light-emitting element. The at least one pixel circuit is configured to drive the at least one light-emitting element to emit light. The at least one pixel circuit includes a drive module and a light emission control module. The drive module is configured to generate a drive current. The light emission control module is configured to control the drive current to be transmitted to a light-emitting element in response to a light emission control signal. A display period of the display panel includes a first display stage and a second display stage, where in the first display stage, an ineffective pulse duration for the light emission control signal is T1, in the second display stage, an ineffective pulse duration for the light emission control signal is T2, and T1>T2.

19 Claims, 18 Drawing Sheets

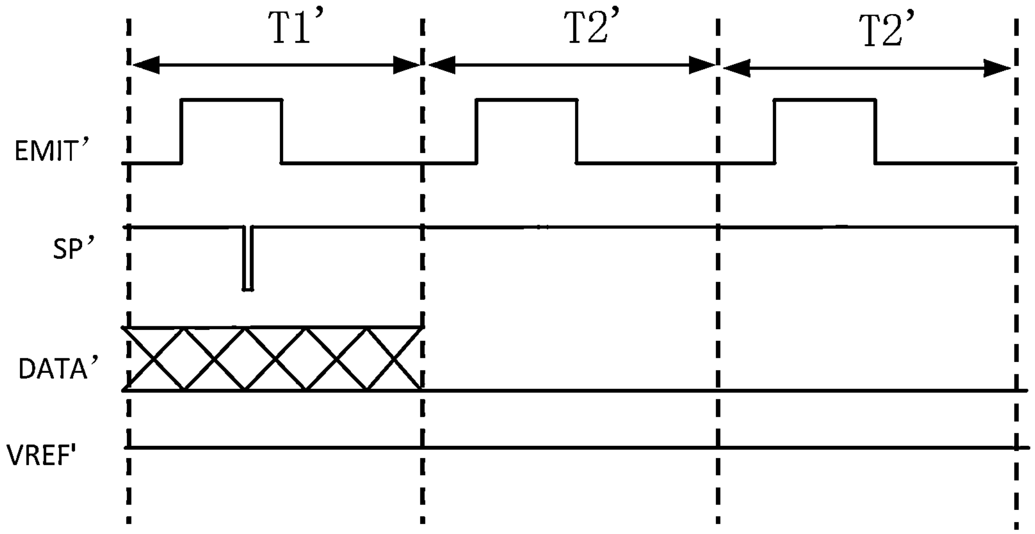
FIG. 1 –Prior art--
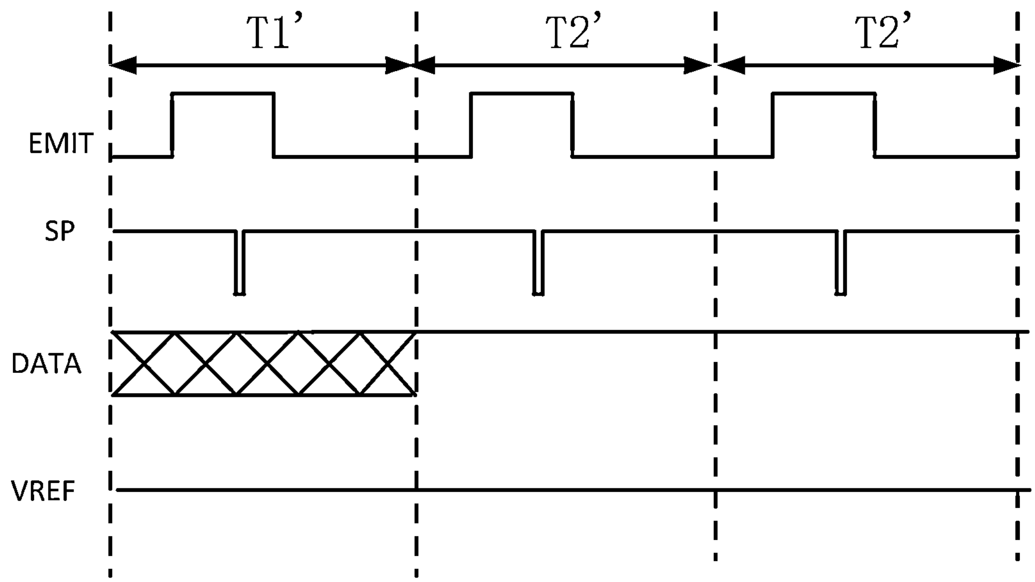
FIG. 2

DISPLAY PANEL AND DISPLAY DEVICE

CROSS-REFERENCE TO RELATED APPLICATION(S)

This application claims priority to Chinese Patent Application No. 202211090997.5 filed Sep. 7, 2022, the disclosure of which is incorporated herein by reference in its entirety.

TECHNICAL FIELD

The present invention relates to the field of display technologies and, in particular, to a display panel and a display device.

BACKGROUND

In the existing art, a panel or device of an electroluminescent element such as an organic light-emitting diode and a mini diode may be driven at different drive frequencies. That is, a display panel may display an image at different refresh rates. For the panel or device with an electroluminescent element, a pixel is driven by increasing a refresh rate when high-speed driving is required, and the pixel is driven by reducing the refresh rate when power consumption needs to be reduced or when low-speed driving is required.

When the refresh rate of a data voltage is updated according to the changing refresh rate, a brightness-level change may be unnaturally perceived by a user. For example, when the refresh rate is switched from a high frequency to a low frequency, the brightness-level change is likely to occur, resulting in the problem of an obvious flicker.

SUMMARY

Embodiments of the present invention provide a display panel and a display device.

Embodiments of the present invention provide a display panel. The display panel includes at least one pixel circuit and at least one light-emitting element. The at least one pixel circuit is configured to drive the at least one light-emitting elements to emit light. The at least one pixel circuit includes a drive module and a light emission control module. The drive module is configured to generate a drive current. The light emission control module is configured to control the drive current to be transmitted to a light-emitting element in response to a light emission control signal. A display period of the display panel includes a first display stage and a second display stage. In the first display stage, the ineffective pulse duration for the light emission control signal is T1, and in the second display stage, the ineffective pulse duration for the light emission control signal is T2, where T1>T2.

Embodiments of the present invention provide a display device, and the display device includes at least one pixel circuit and at least one light-emitting element. The at least one pixel circuit is configured to drive the at least one light-emitting elements to emit light. The at least one pixel circuit includes a drive module and a light emission control module. The drive module is configured to generate a drive current. The light emission control module is configured to control the drive current to be transmitted to a light-emitting element in response to a light emission control signal. A display period of the display panel includes a first display stage and a second display stage. In the first display stage, the ineffective pulse duration for the light emission control signal is T1, and in the second display stage, the ineffective pulse duration for the light emission control signal is T2, where T1>T2.

BRIEF DESCRIPTION OF DRAWINGS

FIG. 1 is a drive timing diagram of a display panel in the existing art.

FIG. 2 is a drive timing diagram of a display panel according to an embodiment of the present invention.

DETAILED DESCRIPTION

Figure 3:
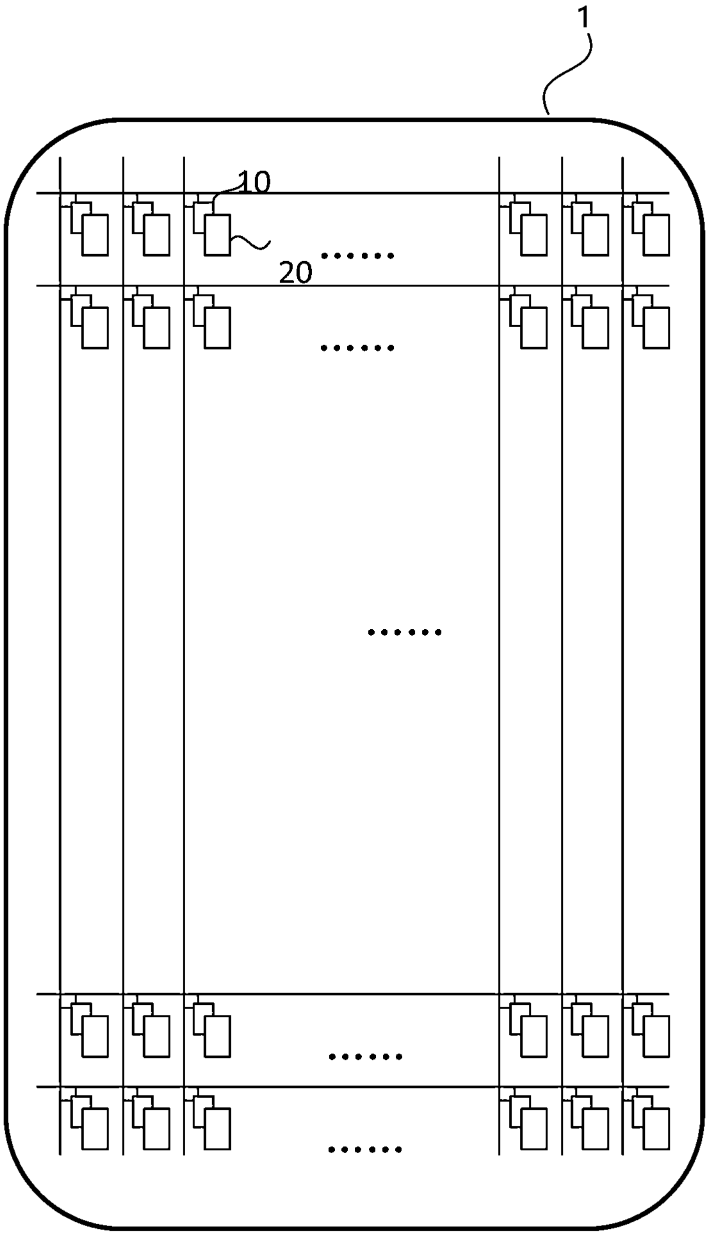
FIG. 3 is a structural diagram of a display panel according to an embodiment of the present invention.

Hereinafter the present invention is further described in detail in conjunction with the drawings and embodiments. It is to be understood that the embodiments described herein are only intended to illustrate but not to limit the present invention. Additionally, it is to be noted that, for ease of description, only part, not all, of structures related to the present invention are illustrated in the drawings.

Multiple modulation manners generally exist when a refresh frequency of a display panel is switched. A modulation manner is that a frequency is reduced on the basis of a fundamental frequency. In general, the frequency may be reduced by integer multiples, which is referred to as a frame insertion method for frequency modulation. In the frame insertion method, a display period of the fundamental frequency includes an effective frame. After the frequency is reduced on the basis of the fundamental frequency, display frames include an effective frame and an ineffective frame. The duration of the effective frame and the duration of the ineffective frame are the same. In other words, an ineffective frame is inserted between adjacent effective frames to reduce a drive frequency. The number of ineffective frames inserted between adjacent effective frames is varied to vary a reduction multiple of the drive frequency. For example, the fundamental frequency is 120 HZ. When one ineffective frame is inserted, the frequency is reduced to 60 HZ; when two ineffective frames are inserted, the frequency is reduced to 40 HZ; and so on. A switch between two drive frequencies may be a switch between the fundamental frequency and a frequency reduced from the fundamental frequency or a switch between two frequencies reduced from the same fundamental frequency. Another implementation is to vary the frame drive duration of a display frame of a fundamental frequency to achieve different fundamental frequencies. For example, the first fundamental frequency is 120 HZ, and the second fundamental frequency is 90 HZ. A frequency reduced from the first fundamental frequency may be 60 HZ, 40 HZ, or 30 HZ. A frequency reduced from the second fundamental frequency may be 45 HZ or 30 HZ. A switch between two drive frequencies may also be a switch between two fundamental frequencies or two frequencies reduced from the two different fundamental frequencies.

FIG. 1 is a drive timing diagram of a display panel in the existing art. FIG. 1 may illustrate the timing for a refresh frequency of the display panel being reduced from a fundamental frequency of 120 HZ to 40 HZ. A display period includes one effective frame T1' and two ineffective frames T2'. However, when a high-frequency refresh rate is reduced to a low-frequency refresh rate, in the effective frame T1', a pixel circuit of the display panel can normally refresh a data signal DATA' so that a light-emitting element can emit light according to the data signal DATA'. The ineffective frames T2' are used for maintaining the brightness-level during the effective frame T1'. Therefore, the ineffective frames T2' are namely used to prolonging the light emission duration on the basis of the effective frame T1'. When the light emission duration increases, the brightness-level of the light-emitting element increases, and the brightness-level is increased obviously at a low greyscale, resulting in a display difference during a frequency switch. In an example, the timing shown in FIG. 2 may be performed. FIG. 2 is a drive timing diagram of a display panel according to an embodiment of the present invention. In this embodiment, in the ineffective frames T2', not only brightness-level during the effective frame T1' is maintained, but also a source of a drive transistor and an anode of the light-emitting element are reset through a scan control signal SP, and an anode of the light-emitting element is reset through a first initialization voltage VREF1, to suppress an increase in the brightness-level of each light-emitting element in the ineffective frames T2'. However, due to the characteristics of the thin-film transistor in the pixel circuit, a leakage current is relatively large. The existence of the ineffective frames T2' may cause the data signal not to be rewritten for a long time, leading to a brightness-level change due to potentials of some nodes of the pixel circuit being interfered with. Especially when a high refresh rate is switched to a low refresh rate, the brightness-level change is relatively large. Besides, at a low greyscale, a flicker is prone to be perceived, resulting in a poor user impression.

Figure 4:
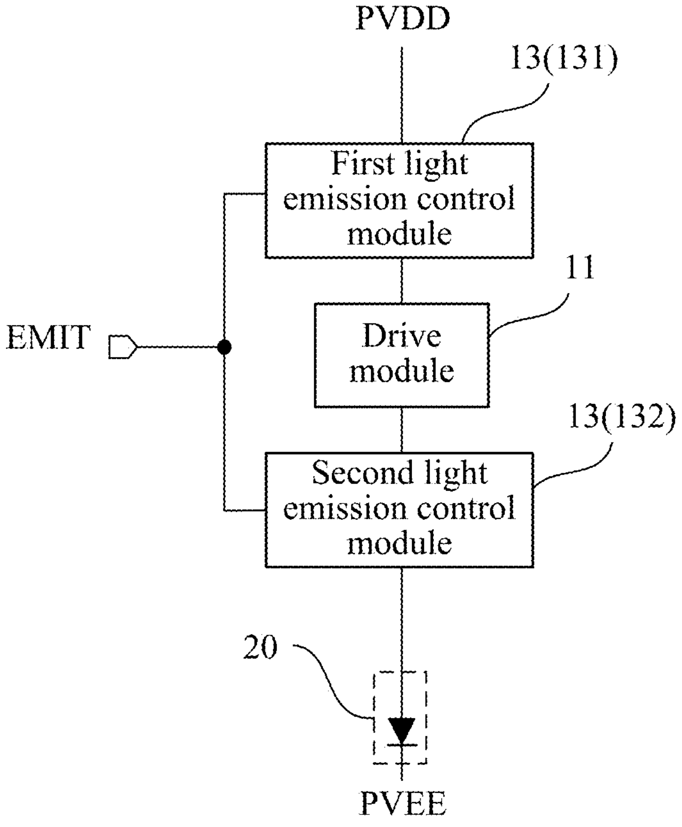
FIG. 4 is a structural diagram of a pixel circuit according to an embodiment of the present invention.
Figure 5:
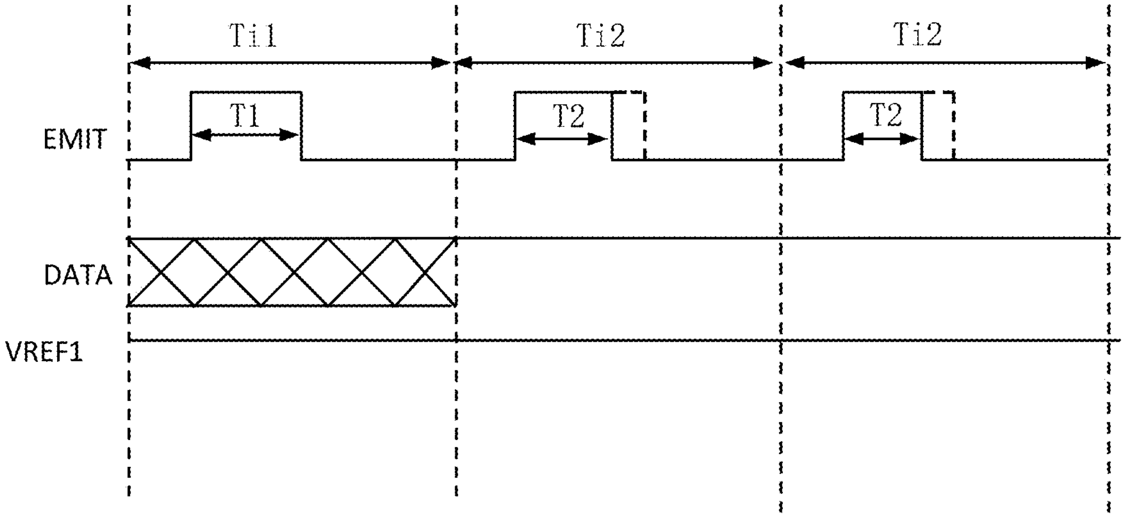
FIG. 5 is another drive timing diagram of a display panel according to an embodiment of the present invention.

Embodiments of the present invention provides a display panel to reduce a bright-level difference in a refresh frequency switching process of the display panel and mitigate a flicker problem. FIG. 3 is a structural diagram of another display panel according to an embodiment of the present invention, FIG. 4 is a structural diagram of a pixel circuit according to an embodiment of the present invention, and FIG. 5 is another drive timing diagram of a display panel according to an embodiment of the present invention. As shown in FIGS. 3 to 5, a display panel 1 includes at least one pixel circuit 10 and at least one light-emitting element 20. The at least one pixel circuit 10 is configured to drive the at least one light-emitting element 20 to emit light.

The pixel circuit 10 includes a drive module 11 and a light emission control module 13. The drive module 11 is configured to generate a drive current. The light emission control module 13 is configured to control the drive current to be transmitted to a light-emitting element 20 in response to a light emission control signal EMIT.

A display period of the display panel includes a first display stage Ti1 and a second display stage Ti2. In the first display stage Ti1, the ineffective pulse duration for the light emission control signal EMIT is T1, and in the second display stage Ti2, the ineffective pulse duration for the light emission control signal EMIT is T2, where T1>T2.

The display panel 1 generally includes sub-pixels arranged in an array. In an example, the sub-pixels may be arranged in rows and columns to form a rectangular array. In another example, the sub-pixels may also be arranged in other regular or irregular forms, which is not limited in the embodiments. Each sub-pixel includes a pixel circuit and a light-emitting element 20. The pixel circuit may drive the light-emitting element 20 to emit light. The pixel circuit may include a drive module 11 and a light emission control module 13. The drive module 11 may be electrically connected to the light-emitting element 20 to supply a drive current to the light-emitting element 20. In an example, as shown in FIG. 4, a first terminal of the drive module 11 may be connected to a first power signal PVDD. A second terminal of the drive module 11 may be connected to an anode of the light-emitting element 20. A cathode of the light-emitting element 20 is connected to a second power signal PVEE. In this case, the first power signal PVDD, the light-emitting element 20, and the second power signal PVEE can form a closed circuit through the drive module 11 so that the drive module 11 can generate the drive current for the light-emitting element 20. The light emission control module 13 is configured to control the drive current to be transmitted to the light-emitting element 20 in response to the light emission control signal so that the first power signal PVDD, the drive module 11, the light-emitting element 20, and the second power signal PVEE form the closed circuit. In this embodiment, the light emission control module 13 may, in response to the light emission control signal EMIT, control the drive module 11 to communicate with the light-emitting element 20. In some embodiments, the light emission control module 13 may include a first light emission control module 131 and a second light emission control module 132. The first light emission control module 131 may, in response to a first light emission control signal EMIT1, turn on the first power signal PVDD and the drive module 11. The second light emission control module 132 may, in response to a second light emission control signal EMIT2, turn on the drive module 11 and the light-emitting element 20. In some embodiments, the first light emission control signal EMIT1 and the second light emission control signal EMIT2 may be the same signal. In this case, as shown in FIG. 4, the first light emission control module 131 and the second light emission control module 132 may respond to the light emission control signal EMIT simultaneously. It is to be noted that each of the first display stage Ti1 or the second display stage Ti2 needs to include at least one ineffective pulse for the light emission control signal EMIT to prevent the at least one light-emitting element 20 from emitting light continuously, to reduce brightness-level drift. It is to be noted that each transistor in the light emission control module 13 controlled by the light emission control signal EMIT being a P-type transistor is taken as an example in this embodiment. When each transistor in the light emission control module 13 is a P-type transistor, each ineffective pulse for the light emission control signal EMIT is at a high level. As shown in FIG. 5, when each transistor in the light emission control module 13 is an N-type transistor, each ineffective pulse for the light emission control signal EMIT is at a low level. Whether each ineffective pulse for the light emission control signal EMIT to be at a high level or a low level is not limited in this embodiment.

A display period of the display panel is a period between the start of refreshing the current image and the start of refreshing the next image, that is, a period between the start of an effective frame of the current image and the start of an effective frame of the next image. The display period may include the first display stage Ti1 and the second display stage Ti2. When a refresh frequency is changed by using a frame insertion method, in this embodiment, the first display stage Ti1 may be an effective frame, and the second display stage Ti2 may be an ineffective frame. In the effective frame, the ineffective pulse duration for the light emission control signal EMIT is T1. In the ineffective frame, the ineffective pulse duration for the light emission control signal EMIT is T2. As the name implies, the ineffective pulse is a signal stage in which the light emission control signal EMIT controls the light-emitting element not to emit light. In one frame which is either the effective frame or the ineffective frame, the shorter the ineffective pulse duration for the light emission control signal EMIT, the longer the effective pulse duration and the longer the light emission duration of the light-emitting element, effectively delaying the brightness-level decay of the light-emitting element and avoiding the problem of a flicker at a low greyscale. In this embodiment, T1>T2. It indicates that the light emission duration of the light-emitting element in the first display stage Ti1 is shorter than the light emission duration of the light-emitting element in the second display stage Ti2. As shown in FIG. 5, the ineffective pulse duration plus a dotted portion in the second display stage Ti2 and the ineffective pulse duration in the first display stage Ti1 are the same and are each T1. It is obvious that the actual ineffective pulse duration T2 in the second display stage Ti2 is shorter than T1. In this case, the light emission duration in the second display stage Ti2 is longer than the light emission duration in the first display stage Ti1, facilitating delay the brightness-level decay speed of the light-emitting element, mitigating the problem of a relatively large brightness-level difference in a refresh frequency switching process, and effectively avoiding the problem of an image flicker of the display panel.

In embodiments of the present invention, a pixel circuit includes a drive module and a light emission control module. The drive module is configured to generate a drive current to drive a light-emitting element. The light emission control module is configured to control the drive current to be transmitted from the drive module to the light-emitting element in response to a light emission control signal. A display period of the display panel includes a first display stage and a second display stage. The first display stage and the second display stage each includes an ineffective pulse for the light emission control signal. Moreover, the ineffective pulse duration for the light emission control signal in the first display stage is longer than the ineffective pulse duration for the light emission control signal in the second display stage so that the light emission duration of the light-emitting element in the second display stage is longer than the light emission duration of the light-emitting element in the first display stage. Especially when a high refresh frequency is switched to a low refresh frequency, according to this embodiment, the problem of an unstable node potential caused by a relatively large leakage current of the pixel circuit is compensated by increasing the light emission duration of the light-emitting element in the second display stage, effectively compensating for brightness-level decay, mitigating the problem of a flicker perceived by human eyes when the refresh frequency is switched, and improving the image display effect of the display panel.

The technical solutions in embodiments of the present invention are described clearly and completely hereinafter in conjunction with the drawings in embodiments of the present invention. Based on embodiments of the present invention, all other embodiments obtained by those of ordinary skill in the art without creative work are within the protection scope of the present invention.

Figure 6:
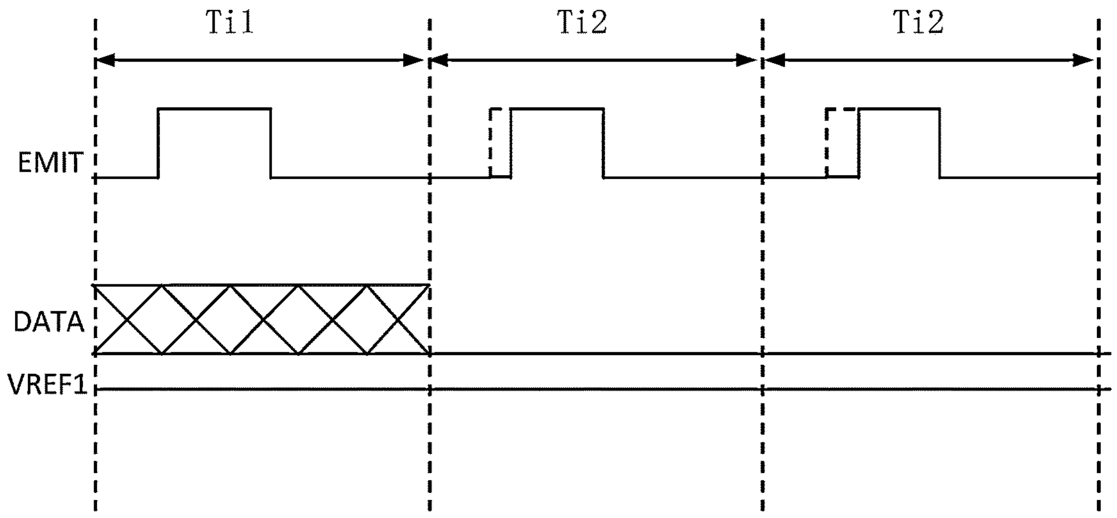
FIG. 6 is another drive timing diagram of a display panel according to an embodiment of the present invention.

It is to be noted that, in FIG. 5, the effective pulse duration for the light emission control signal EMIT is increased by adjusting from the end time of an ineffective pulse for the light emission control signal EMIT, thereby compensating the effective pulse duration. In an example, as shown in FIG. 6, FIG. 6 is another drive timing diagram of a display panel according to an embodiment of the present invention. The effective pulse duration for the light emission control signal EMIT may also be increased by adjusting from the start time of the ineffective pulse for the light emission control signal EMIT, thereby compensating the effective pulse duration. The compensation manner of the effective pulse for the light emission control signal EMIT is not limited in this embodiment.

In some embodiments, the display period of the display panel includes the first display stage Ti1 and multiple second display stages Ti2. Ineffective pulse durations for the light emission control signal EMIT in the second display stages Ti2 are the same. The first display stage Ti2 includes an ineffective pulse for the light emission control signal EMIT or the second display stages Ti2 each includes an ineffective pulse for the light emission control signal EMIT. As shown in FIG. 5, the ineffective pulse durations T2 for the light emission control signal EMIT in the second display stages Ti2 are the same in this embodiment. In this case, the timing control is simple. Moreover, T1>T2. The light emission duration of the light-emitting element in each second display stage Ti2 is longer than the light emission duration of the light-emitting element in the first display stage Ti1, facilitating delay the displayed brightness-level decay generated by the leakage of the pixel circuit, mitigating the problem of a relatively large brightness-level difference in the refresh frequency switching process, and effectively avoiding the problem of an image flicker of the display panel.

Figure 7:
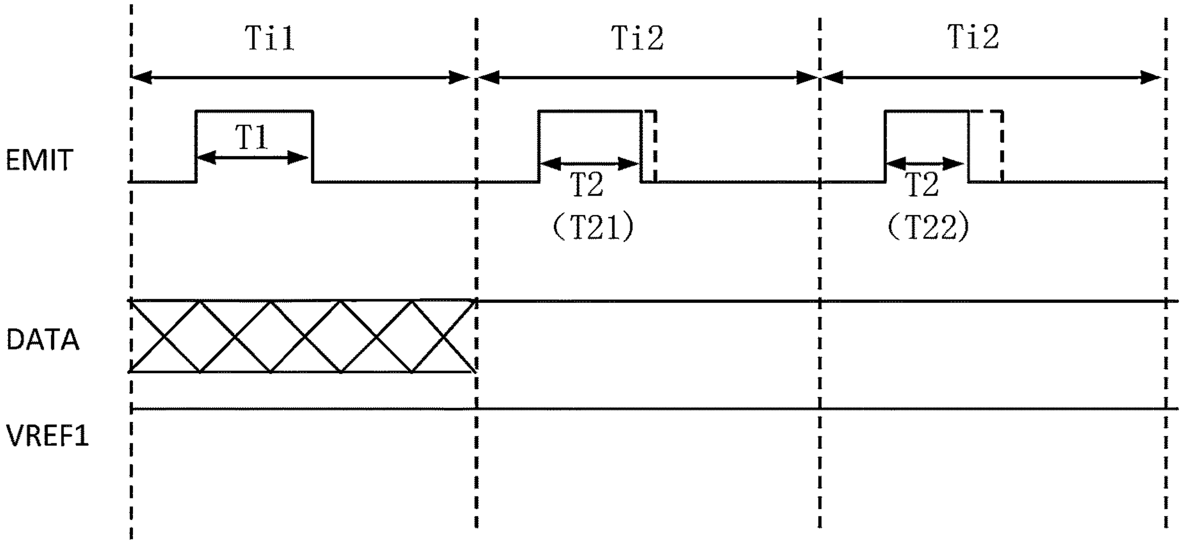
FIG. 7 is another drive timing diagram of a display panel according to an embodiment of the present invention.

FIG. 7 is another drive timing diagram of a display panel according to an embodiment of the present invention. In some embodiments, the display period of the display panel includes the first display stage Ti1 and multiple second display stages Ti2. Ineffective pulse durations for the light emission control signal EMIT in at least two second display stages Ti2 are different. When multiple second display stages Ti2 exist, the ineffective pulse durations T2 for the light emission control signal EMIT in the second display stages Ti2 may be different. However, in this case, T1 and T2 still need to satisfy that T1>T2. That is, the light emission duration of the light-emitting element in a second display stage Ti2 is longer than the light emission duration of the light-emitting element in the first display stage Ti1, alleviating the decay of the displayed brightness-level, avoiding the problem of a relatively large brightness-level change in the frequency switching process, and improving the user experience.

With continued reference to FIG. 7, In some embodiments, the display period of the display panel includes the first display stage Ti1 and N second display stages Ti2. N is an integer greater than or equal to 2. The first one of the second display stages Ti2 is adjacent to the first display stage Ti1. In the i-th second display stage Ti2, the ineffective pulse duration for the light emission control signal is T21, and in the (i+1)-th second display stage Ti2, the ineffective pulse duration for the light emission control signal is T22, where T21>T22, $1 \le i \le N-1$, and i is an integer. When multiple second display stages Ti2 exist, the ineffective pulse durations T2 for the light emission control signal EMIT in the second display stages Ti2 may be different. In this embodiment, N second display stages Ti2 may be included. N is an integer greater than or equal to 2. The first one of the second display stages Ti2 of the N second display stages Ti2 is adjacent to the first display stage Ti1. The n-th second display stage Ti2 is farthest from the first display stage Ti1. In the N second display stages Ti2, the ineffective pulse duration for the light emission control signal EMIT in the i-th second display stage Ti2 is set to T21, and the ineffective pulse duration for the light emission control signal EMIT in the (i+1)-th second display stage Ti2 is set to T22, which needs to satisfy that T21>T22. In this case, it indicates that the light emission duration of the light-emitting element in the i-th second display stage Ti2 is shorter than the light emission duration of the light-emitting element in the (i+1)-th second display stage Ti2. That is, light emission durations of the light-emitting element in the N second display stages Ti2 increase gradually. Since the brightness-level decay of the light-emitting element increases gradually along with an increase in the holding time, the brightness-level decay increases gradually when the number of second display stages Ti2 increases. In this embodiment, in combination with a brightness-level decay law, different light emission duration is compensated (increased) for different second display stages Ti2, significantly mitigating the problem of a brightness-level change and the problem of a flicker during the frequency switch, making the brightness-level change more stable, and further improving the image display effect of the display panel.

Figure 8:
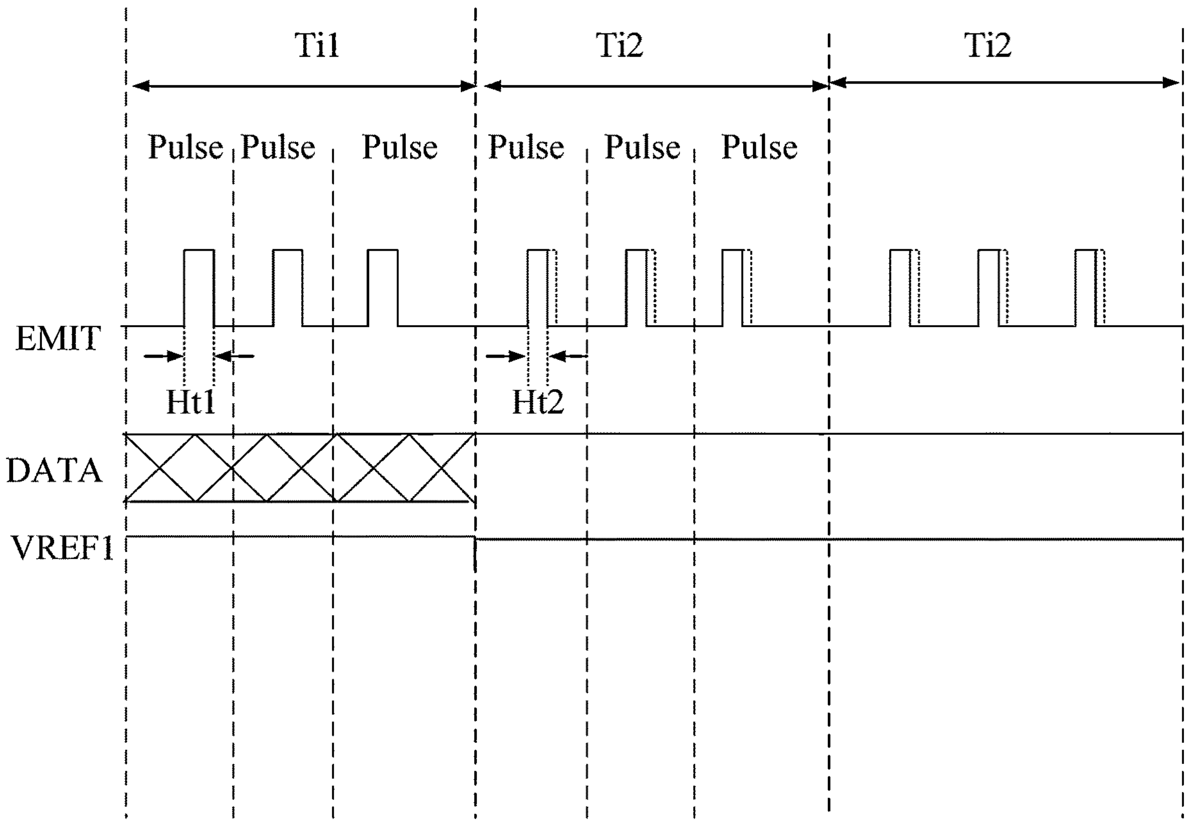
FIG. 8 is another drive timing diagram of a display panel according to an embodiment of the present invention.

On the basis of the preceding embodiments, this embodiment can verify the brightness-level improvement effect of the light-emitting element. Before verification, the concept of a display sub-stage needs to be clarified. When the frame insertion method is used, the refresh frequency can be reduced by integer multiples. For example, when a fundamental frequency is 120 HZ, the refresh frequency can be only switched to, for example, 60 HZ, 40 HZ, and 30 HZ. Each effective frame and each ineffective frame may be equally divided into multiple display sub-stages (pulses). As shown in FIG. 8, FIG. 8 is another drive timing diagram of a display panel according to an embodiment of the present invention. Durations of the display sub-stages are the same. Each display sub-stage may include an ineffective pulse for the light emission control signal EMIT. In some embodiments, it is assumed that the refresh frequency is 40 Hz and that one effective frame and two ineffective frames are included. In this case, the effective frame is taken as the first display stage Ti1, and the ineffective frame is taken as the second display stage Ti2. Each effective frame and each ineffective frame may include three display sub-stages. In an example, ineffective pulse widths for the light emission control signal EMIT in the display sub-stages in each frame are the same. It can be seen that the ineffective pulse duration for the light emission control signal EMIT in the first display stage Ti1 is T1, and if the ineffective pulse for the light emission control signal EMIT in the first display stage Ti1 is equally divided into three ineffective pulses for the light emission control signal EMIT, the width of each of the three ineffective pulses in the first display stage Ti1 is Ht1. The duration of each ineffective pulse for the light emission control signal EMIT in the second display stage Ti2 is T2, and if the ineffective pulse for the light emission control signal EMIT in the second display stage Ti2 is equally divided into three ineffective pulses for the light emission control signal EMIT and the width of each of three ineffective pulses for the light emission control signal EMIT in the second display stage Ti1 is Ht2. It may be controlled that each Ht1 and each Ht2 satisfy Ht1>Ht2 so that T1>T2, increasing the light emission duration in the second display stage Ti2, ameliorating the problem of a brightness-level change and the problem of a flicker during the frequency switch, and further improving the image display effect of the display panel. In another example, in the first display stage Ti1 and the second display stage Ti2, widths of three ineffective pulses for the light emission control signal EMIT may be different, which is not limited in this embodiment.

Figure 9:
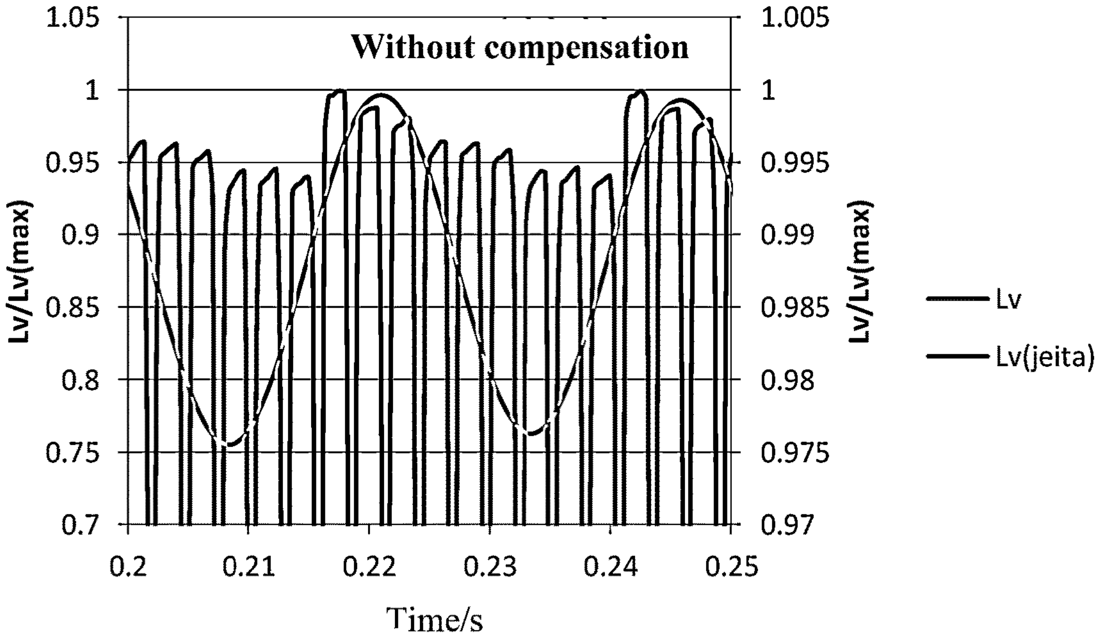
FIG. 9 is a diagram illustrating the brightness-level of the drive timing of the display panel in FIG. 2.
Figure 10:
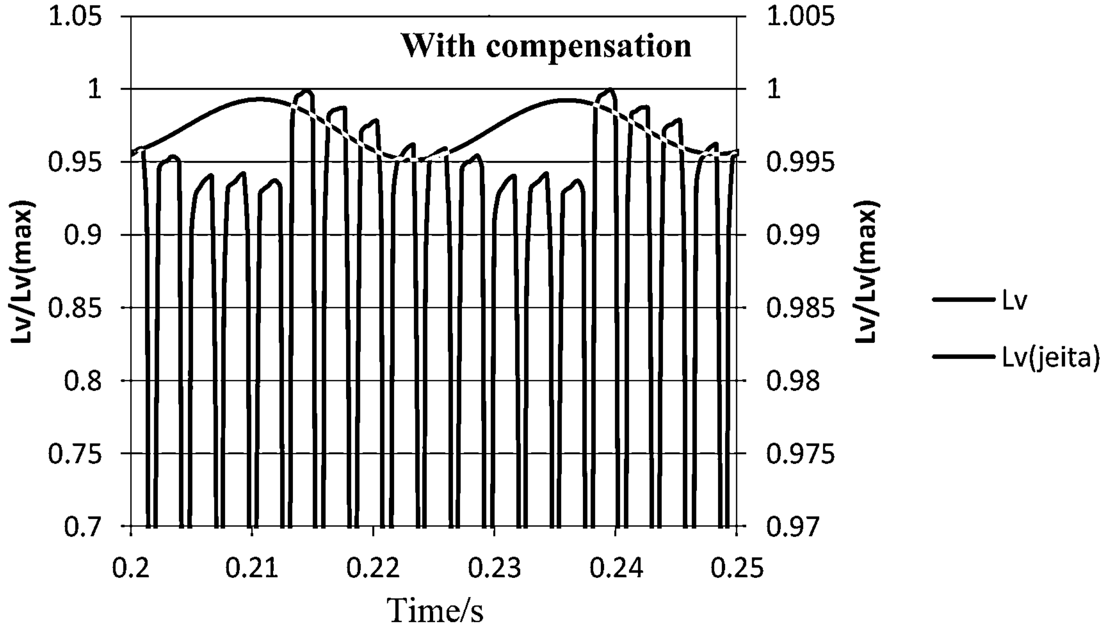
FIG. 10 is a diagram illustrating the brightness-level of the drive timing of the display panel in FIG. 8.

FIG. 9 is a diagram illustrating the brightness-level of the drive timing of the display panel in FIG. 2. FIG. 10 is a diagram illustrating the brightness-level of the drive timing of the display panel in FIG. 8. It is assumed that the current refresh frequency is 40 Hz, that one effective frame and two ineffective frames are included, and that each frame includes three display sub-stages (pulses). In this embodiment, a brightness-level simulation experiment is performed with the brightness-level of 500 nits and the greyscale of G255. It is to be noted that when the frequency switch is implemented by using the frame insertion method, the first display stage Ti1 is the effective frame, and a second display stage Ti2 is an ineffective frame. For the display panel in FIG. 9, the ineffective pulse for the light emission control signal EMIT in the ineffective frame and the ineffective pulse for the light emission control signal EMIT in the effective frame are equal. That is, the light emission duration of the light-emitting element in the ineffective frame is not compensated. An abscissa represents time. An ordinate represents a ratio of a current brightness-level Lv to the highest brightness-level Lv(max). The highest brightness-level Lv(max) is a display brightness-level. The current brightness-level Lv is a greyscale brightness-level under a current greyscale. It is to be noted that the brightness-level mentioned in embodiments of the present invention refers to greyscale brightness-level. Display brightness-level may be specially marked or referred to by using the highest brightness-level Lv(max). Three pulse signals of Lv form one frame. Nine pulse signals of Lv form one display period (including one effective frame and two ineffective frames). It can be seen from FIG. 9 that a brightness-level difference between adjacent frames is relatively large so that a brightness-level change perceived by human eyes is shown as curve Lv(jeita). It can be seen that human eyes can obviously feel the brightness-level change. Referring to FIG. 10, the brightness-level of a second display stage Ti2 (ineffective frame) is compensated in FIG. 10, increasing the light emission duration in the second display stage Ti2 and reducing the ineffective pulse duration for the light emission control signal EMIT in the second display stage Ti2. It can be seen from FIG. 10 that the brightness-level curve Lv(jeita) perceived by human eyes is relatively gentle, that the fluctuation amplitude is relatively small, and that a range of brightness-level changes is relatively small, avoiding a flicker perceived by human eyes and improving the image display effect of the display panel.

Figure 11:
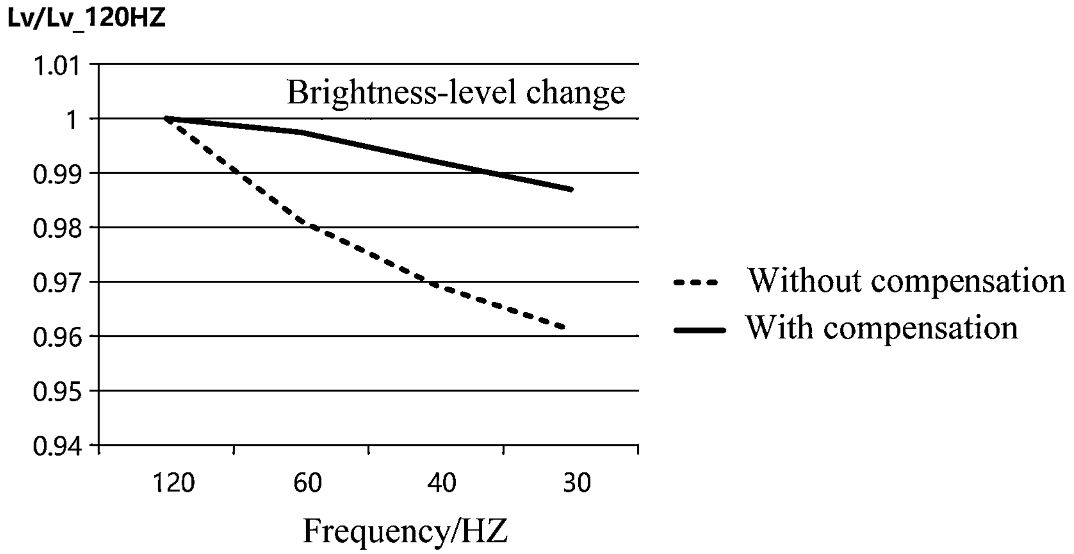
FIG. 11 is a diagram of the brightness-level improvement of the display panel according to an embodiment of the present invention.
Figure 12:
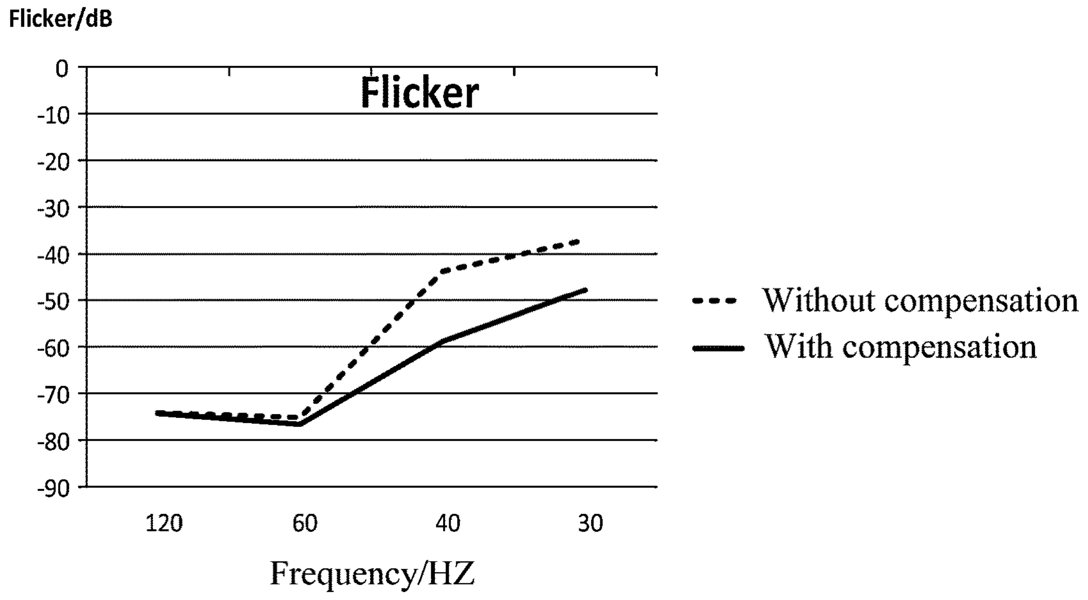
FIG. 12 is a diagram of the flicker mitigation of the display panel according to an embodiment of the present invention.

To further describe the brightness-level difference problem and the flicker problem in detail, as shown in FIGS. 11 and 12, FIG. 11 is a diagram of the brightness-level improvement of the display panel according to an embodiment of the present invention. FIG. 12 is a diagram of the flicker mitigation of the display panel according to an embodiment of the present invention. As shown in FIG. 11, an abscissa represents a frequency, and an ordinate represents a ratio of a brightness-level Lv to a brightness-level Lv_120 Hz at the fundamental frequency of 120 Hz. A dotted line shows a brightness-level change curve of the drive timing of the display panel shown in FIG. 2. A solid line shows a brightness-level change curve of the drive timing of the display panel in this embodiment. It can be clearly seen that a solution in which the light emission duration in the second display stage Ti2 is compensated can effectively reduce a brightness-level change. For the solution without compensation, the brightness-level changes in a relatively large range, and the brightness-level change is easily perceived, while, for the solution with compensation, the brightness-level changes in a relatively small range, effectively improving display efficiency. Referring to FIG. 12, an abscissa represents a frequency, and an ordinate represents a flicker degree. A dotted line shows a flicker change curve of the drive timing of the display panel shown in FIG. 2. A solid line shows a flicker change curve of the drive timing of the display panel in this embodiment. It can be seen that the solution in which the light emission duration in the second display stage Ti2 is compensated effectively mitigates the flicker problem. The flicker degree is closer to 0 dB, effectively mitigating the flicker problem and improving the image display effect of the display panel.

In some embodiments, the first display stage Ti1 and a second display stage Ti2 each include c display sub-stages, and each display sub-stage includes one ineffective pulse for the light emission control signal, where c is an integer greater than or equal to 1.

When the first display stage Ti1 and the second display stage Ti2 each include c display sub-stages, due to that the duration of each display sub-stage is fixed, the duration of the first display stage Ti1 is the same as the duration of the second display stage Ti2. In this case, the first display stage Ti1 is the effective frame, and the second display stage Ti2 is an ineffective frame. The preceding embodiments are described by taking the case in which the first display stage Ti1 is the effective frame and the second display stage Ti2 is an ineffective frame as an example. As shown in FIG. 8, each display sub-stage includes one ineffective pulse for the light emission control signal EMIT. In each display stage (the first display stage Ti1 or the second display stage Ti2), the ineffective pulse widths for the light emission control signal EMIT in the display sub-stages may be the same or different, which is not limited in this embodiment. It is to be noted that each display stage may include multiple display sub-stages, and in this case, multiple ineffective pulses may be provided for the light emission control signal in each display stage. Each display stage may also include only one display sub-stage, and in this case, only one ineffective pulse may be provided for the light emission control signal in each display stage.

Figure 13:
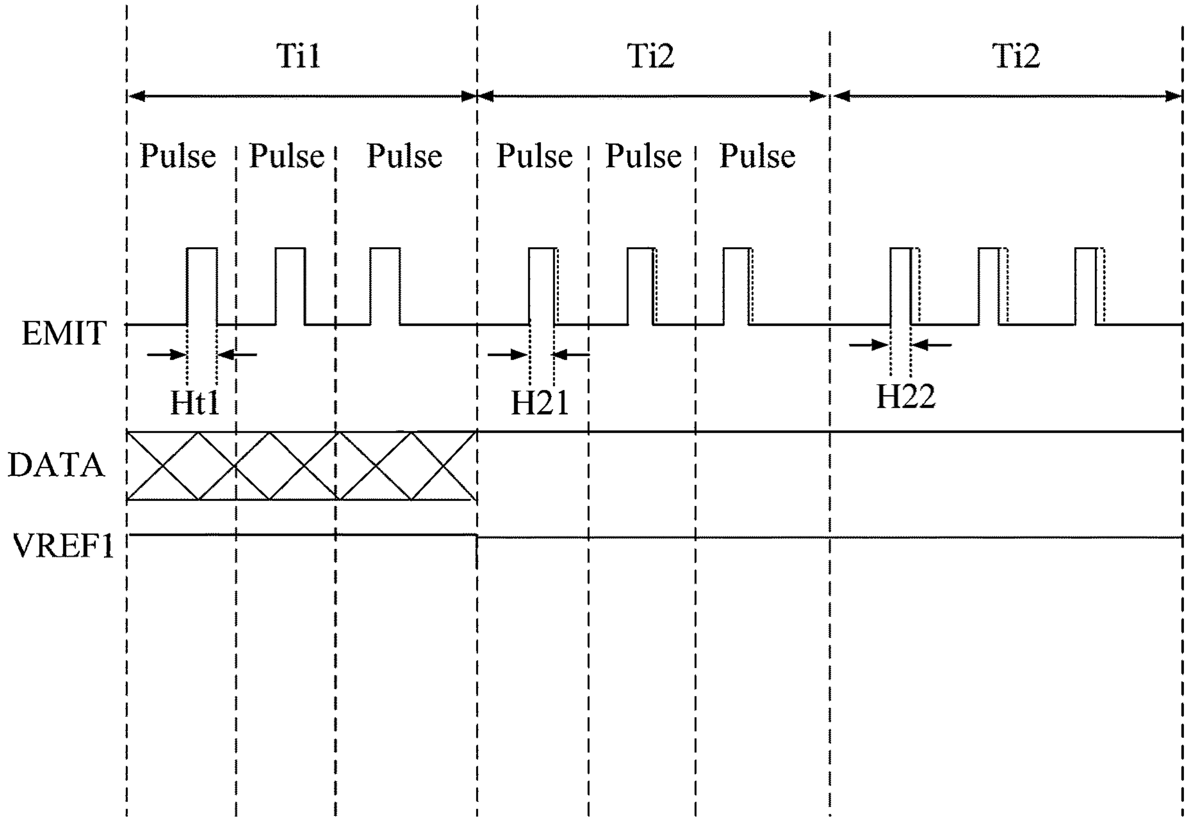
FIG. 13 is another drive timing diagram of a display panel according to an embodiment of the present invention.

As shown in FIG. 8, in some embodiments, c is an integer greater than or equal to 2. In the same first display stage Ti1 or the same second display stage Ti2, the ineffective pulse widths for the light emission control signal EMIT in the display sub-stages (pulses) are the same. In some embodiments, as shown in FIG. 13, FIG. 13 is another drive timing diagram of a display panel according to an embodiment of the present invention. In two adjacent second display stages Ti2, a difference between ineffective pulse widths for the light emission control signal is E, and $E=H21-H22$. H21 and H22 are the ineffective pulse widths for the light emission control signal in the two adjacent second display stages Ti2 respectively, wherein $2L \le E \le 8L$, in which, L is a row time at a current drive frequency f of the pixel circuit, $L=1/(f \times b)$, and b is the total number of rows of subpixels in the pixel circuit of the display panel.

It can be seen that the ineffective pulse duration for the light emission control signal in one of two adjacent second display stages Ti2 is T21. In this case, the width of the ineffective pulse for the light emission control signal EMIT in each pulse is that $H21=T21/c$. Similarly, if the ineffective pulse duration for the light emission control signal in the other one of the two adjacent second display stages Ti2 is T22, the width of the ineffective pulse for the light emission control signal EMIT in each pulse is that $H22=T22/c$. A value range of a difference E between the two adjacent second display stages Ti2 may be two to eight times of row time. That is, $2L \le E \le 8L$. A piece of row time is the time required for a scan circuit to scan one row of sub-pixels. It is to be noted that the time per frame is 1/f. When the display panel includes b rows of sub-pixels, each row time is that $L=1/(f \times b)$. When multiple ineffective frames exist, a light emission duration difference of two to eight times of row time exists between display sub-stages (pulses) between adjacent frames. According to this arrangement, the light emission duration of the light-emitting element in an ineffective frame is gradually increased, effectively mitigating the problem of a change in the displayed brightness-level and the problem of a flicker at a low greyscale during the frequency switch and effectively improving the image display effect. For the frequency-switching brightness-level and flicker control at a low frequency, in this embodiment, E may denote an integer multiple of the minimum period in which an output for the light emission control signal EMIT is changed. For example, if one shift register circuit of a gate scan circuit pushes one row of sub-pixels, the minimum period is two times of row time; and if one shift register circuit pushes two rows of sub-pixels, the minimum period is four times of row time. In this case, the value range of E may be four to eight times of row time.

In some embodiments, the increased width H1 of an effective pulse for the light emission control signal in each display sub-stage in the first one of the second display stages Ti2 relative to an effective pulse width for the light emission control signal in each display sub-stage in the first display stage is that $$H1 = \frac{b \times a\%}{C},$$

in which, a % denotes a brightness-level reduction value when a drive frequency of the pixel circuit is reduced from the fundamental frequency to the current drive frequency f. The increased duration Hp of an effective pulse for the light emission control signal in each display sub-stage in the p-th second display stage relative to the effective pulse for the light emission control signal in each display sub-stage in the first display stage is that $$Hp = \frac{b \times a\%}{C} + (p-1) \times E,$$

in which, 2≤p≤N, and p is an integer.

When the first display stage Ti1 is the effective frame and a second display stage Ti2 is an ineffective frame, display sub-stages (pulses) between two adjacent ineffective frames may have a light emission duration difference of two to eight times of row time. On this basis, in this embodiment, the width of an effective pulse for the light emission control signal in the first ineffective frame close to the effective frame is controlled accurately, thereby accurately compensating for the brightness-level according to the brightness-level decay law, effectively maintaining the stability of the brightness-level, and improving the display effect. It can be seen that the second display stage Ti2 or the first display stage Ti1 each include c display sub-stages. Each display sub-stage includes an effective pulse for the light emission control signal EMIT and an ineffective pulse for the light emission control signal EMIT. In this embodiment, the increased width H1 of the effective pulse for the light emission control signal in each display sub-stage in the first one of the second display stages Ti2 relative to the effective pulse for the light emission control signal in each display sub-stage in the first display stage is that $$H1 = \frac{b \times a\%}{C},$$

where a % denotes the brightness-level reduction value when the drive frequency of the pixel circuit is reduced from the fundamental frequency to the current drive frequency f. In this embodiment, the brightness-level of the entire display period is equally divided into each display sub-stage for display. That is, a compensation principle in this embodiment is to compensate for all brightness-level reduction values during the frequency switching process so as to compensate for the brightness-level decay caused by a leakage current of the pixel circuit to the greatest extent, reducing a brightness-level difference and effectively mitigating the flicker problem. On this basis, the increased width H2 of the effective pulse width for the light emission control signal in each display sub-stage in the second display stage Ti2 relative to the effective pulse for the light emission control signal in each display sub-stage in the first display stage is that $$H2 = \frac{b \times a\%}{C} + E.$$

The increased width H3 of the effective pulse width for the light emission control signal in each display sub-stage in the third second display stage Ti2 relative to the effective pulse for the light emission control signal in each display sub-stage in the first display stage is that $$H3 = \frac{b \times a\%}{C} + 2E.$$

The rest can be done in the same way. Display sub-stages (pulses) between adjacent frames have a light emission duration difference of two to eight times of row time. The light emission duration of the light-emitting element in an ineffective frame is increased gradually according to this law, which effectively improves a change in the displayed brightness-level during the frequency switch.

Figure 14:
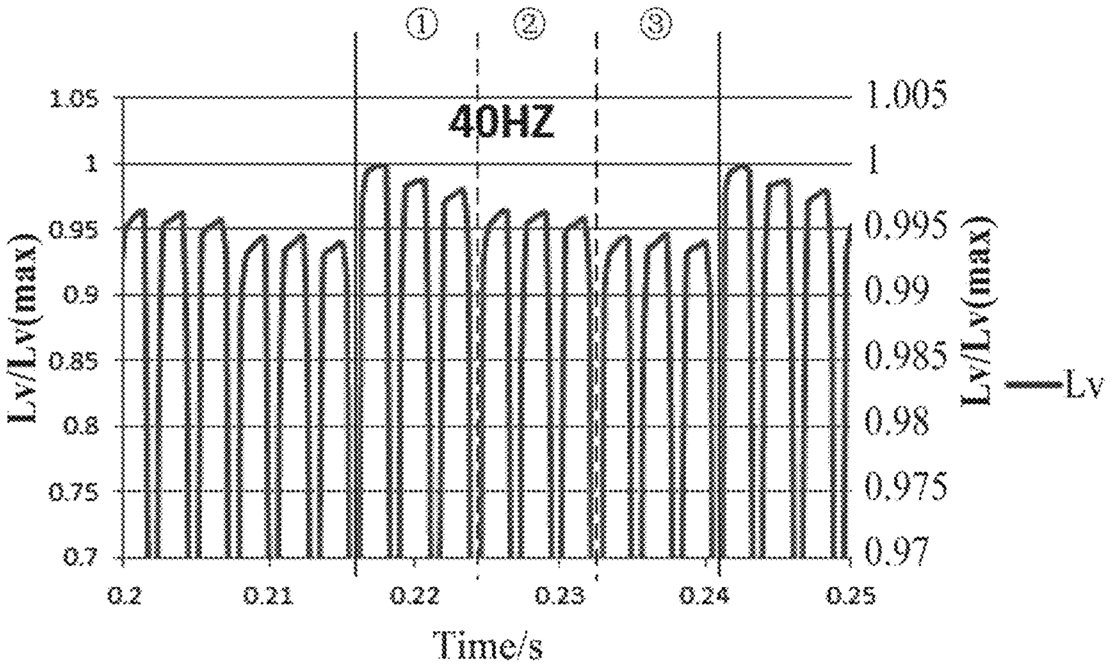
FIG. 14 is a diagram illustrating the brightness-level of the drive timing of a display panel according to an embodiment of the present invention.

It is to be noted that for the display panel with a light emission compensation having been performed for a second display stage Ti2, a % can still be acquired from the compensated display panel to perform the configuration for the width of the effective pulse for the light emission control signal in each preceding display sub-stage. FIG. 14 is a diagram illustrating the brightness-level of the drive timing of a display panel according to an embodiment of the present invention. The acquisition method of an a % includes the following processes: taking a waveform of 40 Hz in FIG. 14 is taken as an example, in which a period between two solid lines represents one complete frame (effective frame or ineffective frame) of 40 Hz and is divided into three display sub-stages, a display sub-stage ①, a display sub-stage ②, and a display sub-stage ③, and the display sub-stage ① is repeated for another two periods to form a waveform of three pulses of 120 Hz, the waveform of three pulses of 120 Hz is integrated with time to obtain the average brightness-level at 120 Hz, the brightness-level compensation value is obtained by comparing the average brightness-level at 120 Hz with the average brightness-level at 40 Hz, and a % is acquired. Additionally, whether the effective pulse for the light emission control signal EMIT is compensated may be simply verified by comparing the light emission duration in each display sub-stage (pulse), thereby simply verifying a solution of this embodiment.

Figure 15:
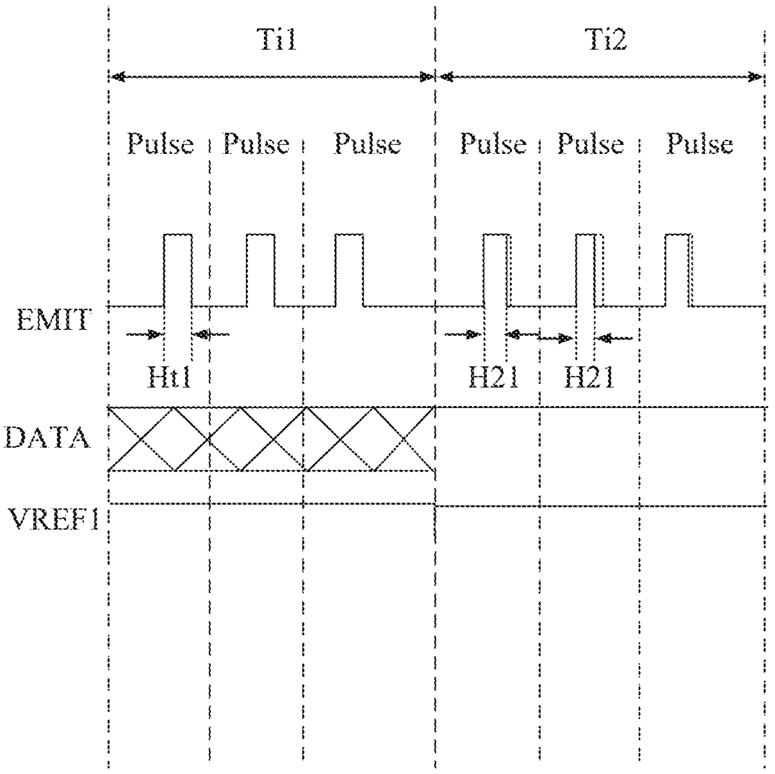
FIG. 15 is another drive timing diagram of a display panel according to an embodiment of the present invention.

FIG. 15 is another drive timing diagram of a display panel according to an embodiment of the present invention. In some embodiments, in the same second display stage Ti2, ineffective pulse widths for the light emission control signal in two display sub-stages are different. In the same second display stage Ti2, it may be provided in this embodiment that the widths H21 of the ineffective pulses for the light emission control signal EMIT in the two display sub-stages are different so that the specific setting of the widths H21 of the ineffective pulses for the light emission control signal EMIT is further refined according to the brightness-level decay law of the pixel circuit, thereby further mitigating the brightness-level change problem and the flicker problem. In some embodiments, with continued reference to FIG. 15, in the same second display stage Ti2, the width of an ineffective pulse for the light emission control signal in an m-th display sub-stage is Hm, and the width of an ineffective pulse for the light emission control signal in an (m+1)-th display sub-stage is H(m+1). Hm>H(m+1). 1≤m≤c−1. m is an integer. Similarly, the displayed brightness-level of the light-emitting element decays with an increase in the time of an ineffective frame (second display stage Ti2). In this embodiment, according to the brightness-level decay law, when the same second display stage Ti2 includes multiple display sub-stages, the width Hm of the ineffective pulse in the previous display sub-stage is greater than the width H(m+1) of the ineffective pulse in the subsequent display sub-stage. In this case, in the same second display stage Ti2, widths of effective pulses for the light emission control signal EMIT in the display sub-stages increase gradually so as to further enhance the light emission compensation according to the brightness-level decay law of the pixel circuit, thereby further mitigating the problem of a relatively large brightness-level change and the flicker problem and improving the display effect.

In this embodiment, the first display stage Ti1 is the effective frame. At least part of the second display stages Ti2 may not be ineffective frames. In a switch between the same fundamental frequency and a frequency after the fundamental frequency is reduced, the frame insertion method may not be used. A pulse insertion method is used in this embodiment. When the refresh frequency of the display panel is changed by using the frame insertion method, durations of all display sub-stages (pulses) are the same. In this case, when the number of inserted pulses is an integer multiple of the number c of pulses in the effective frame, each second display stage Ti2 is an ineffective frame. When the number of inserted pulses is not an integer multiple of the number c of pulses in the effective frame, the number of pulses in a second display stage Ti2 must be different from the number of pulses in the effective frame. In this embodiment, the pulse insertion method is used so as to implement the frequency switch between 120 HZ and 60 HZ, for example, the adjustment to a frequency of 90 HZ, thereby enlarging a switching range of the refresh frequency.

Figure 16:
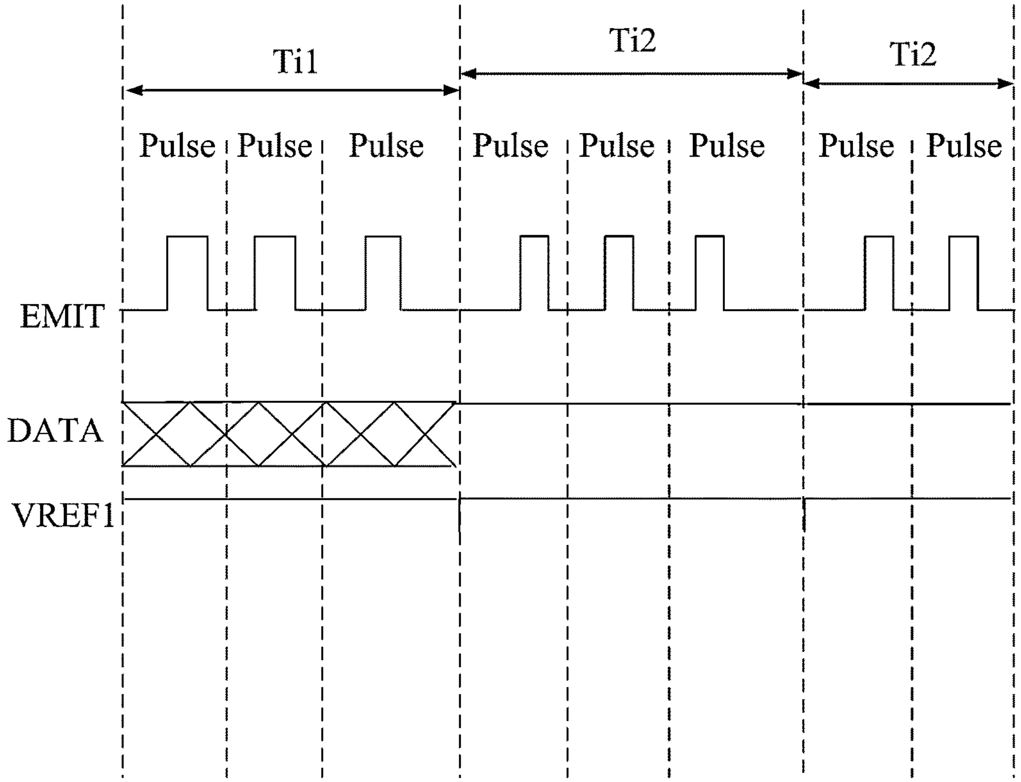
FIG. 16 is another drive timing diagram of a display panel according to an embodiment of the present invention.

As shown in FIG. 16, FIG. 16 is another drive timing diagram of a display panel according to an embodiment of the present invention. In some embodiments, the first display stage and/or part of the second display stages each include c1 display sub-stages, each of the c1 display sub-stage comprises one ineffective pulse for the light emission control signal, where c1 is an integer greater than or equal to 2. At least one of the second display stages includes c2 display sub-stages, where c2 is greater than or equal to 1. In this embodiment, the number of pulses in the effective frame may be c1, for example, may be three. When the number of inserted pulses is not an integer multiple of three, for example, is five, one second display stage Ti2 includes c1 display sub-stages (pulses), while another second display stage Ti2 includes (5−c1) display sub-stages (pulses), that is, c2 display sub-stages. In this example, c2 is two. In this embodiment, the refresh frequency is between 120 Hz and 60 Hz. In this case, this embodiment can effectively improve the adjustment range of the refresh frequency of the display panel, improve the accuracy of brightness-level adjustment, further mitigate the flicker problem, and improve the image display effect.

Figure 17:
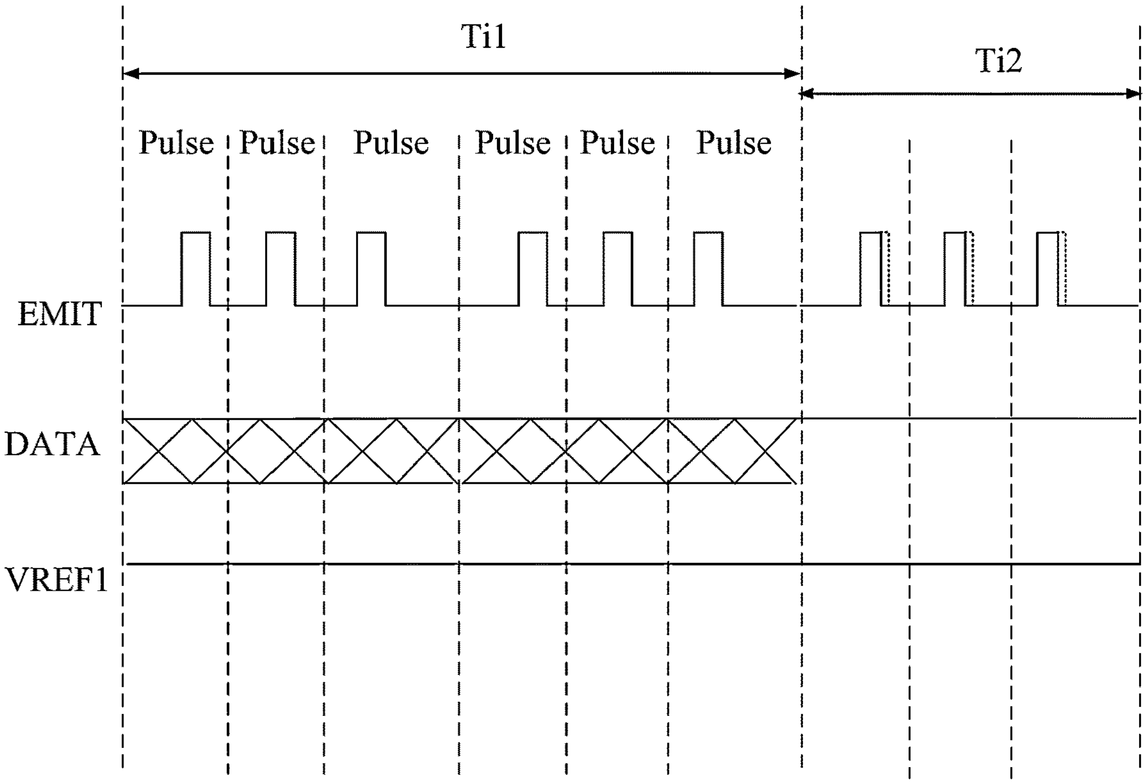
FIG. 17 is another drive timing diagram of a display panel according to an embodiment of the present invention.

In an example, FIG. 17 is another drive timing diagram of a display panel according to an embodiment of the present invention. When multiple pulses instead of an entire frame are inserted during the frequency switch, for example, during which the frequency is switched from 120 HZ to 90 HZ, it is necessary to add half of the number c of pulses in one frame. For example, if the effective frame includes six pulses, an added second display stage Ti2 would include three pulses. In this case, it is also necessary to compensate for the inserted pulses for the light emission control signal EMIT, and a calculation method therefor is as below.

Assuming that the brightness-level is reduced by about a % when 120 Hz is switched to 90 Hz, that the total number of rows is b, and that the EM effective frame includes c pulses, a compensation formula for the light emission control signal EMIT is as below:

an increased width H1 of the effective pulse width for the light emission control signal in the first one of pulses in the second display stage Ti2 relative to the effective pulse for the light emission control signal in each display sub-stage in the first display stage is that H1=b×a %/c;

an increased width H2 of the effective pulse width for the light emission control signal in the second pulse in the second display stage Ti2 relative to the effective pulse for the light emission control signal in each display sub-stage in the first display stage is that H2=b×a %/c+(2~8) L; and, an increased width H3 of the effective pulse width for the light emission control signal in the third pulse in the second display stage Ti2 relative to the effective pulse for the light emission control signal in each display sub-stage in the first display stage is that H3=b×a %/c+(4~16) L.

The preceding compensation method for the light emission control signal effectively improves the adjustment range of the refresh frequency of the display panel. Moreover, each inserted pulse for the light emission control signal is compensated independently, improving the accuracy of brightness-level adjustment, further mitigating the flicker problem, and improving the image display effect.

In some embodiments, the first display stage Ti1 includes multiple display sub-stages. A second display stage Ti2 includes at least one display sub-stage. Each display sub-stage includes one ineffective pulse for the light emission control signal. In the N-th second display stage Ti2, the first one of the at least one display sub-stage is adjacent to the (N−1)-th second display stage Ti2, the ineffective pulse duration for the light emission control signal in the last one of the at least one display sub-stage is Ta, and the ineffective pulse duration for the light emission control signal in a display sub-stage adjacent to the last one of the at least one display sub-stage is Tb, where Ta>Tb.

Figure 18:
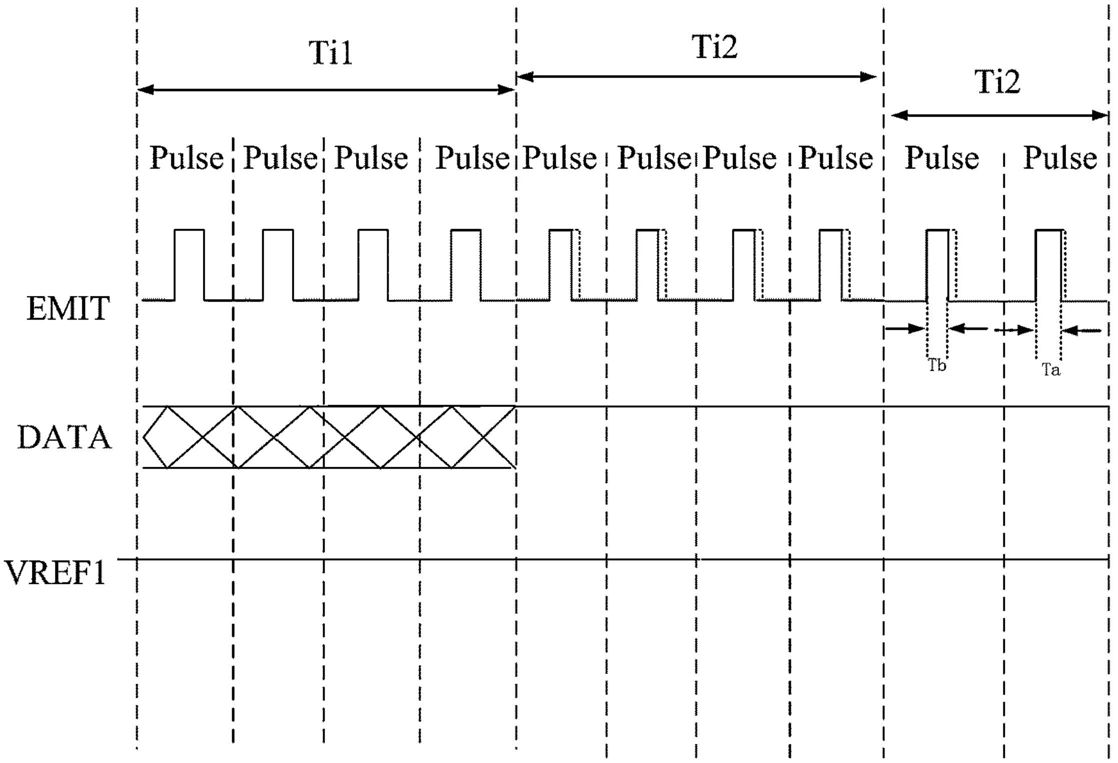
FIG. 18 is another drive timing diagram of a display panel according to an embodiment of the present invention.

On the basis of the preceding embodiments, whether the frame insertion method or the pulse insertion method is used as a manner for switching the refresh frequency, the first display stage Ti1 may include multiple display sub-stages, and a second display stage Ti2 may include at least one display sub-stage. In this embodiment, N second display stages Ti2 are configured, among which, the first one of the second display stages Ti2 is adjacent to the first display stage Ti1, and the N-th second display stage Ti2 is adjacent to the (N−1)-th second display stage Ti2. The number of display sub-stages in each of the (N−1) second display stages Ti2 may be the same as the number of display sub-stages in the first display stage Ti1. As shown in FIG. 18, FIG. 18 is another drive timing diagram of a display panel according to an embodiment of the present invention. When the N-th second display stage Ti2 includes multiple display sub-stages, the first one of the multiple display sub-stages in the N-th second display stage Ti2 is adjacent to the (N−1)-th second display stage Ti2. The ineffective pulse duration for the light emission control signal in the last one of the multiple display sub-stages in the N-th second display stage Ti2 is Ta, and the ineffective pulse duration for the light emission control signal in the display sub-stage adjacent to the last display sub-stage is Tb, where Ta>Tb. In this embodiment, when the last one of the second display stages Ti2 (i.e., the N-th second display stage Ti2) includes multiple display sub-stages, the effective pulse duration for the light emission control signal EMIT in the last one of the multiple display sub-stages in the last one of the second display stages Ti2 is reduced in one display period, thereby reducing the light emission compensation, reducing a sudden change in the brightness-level of the display panel during the frequency switch, and optimizing the display effect.

Figure 19:
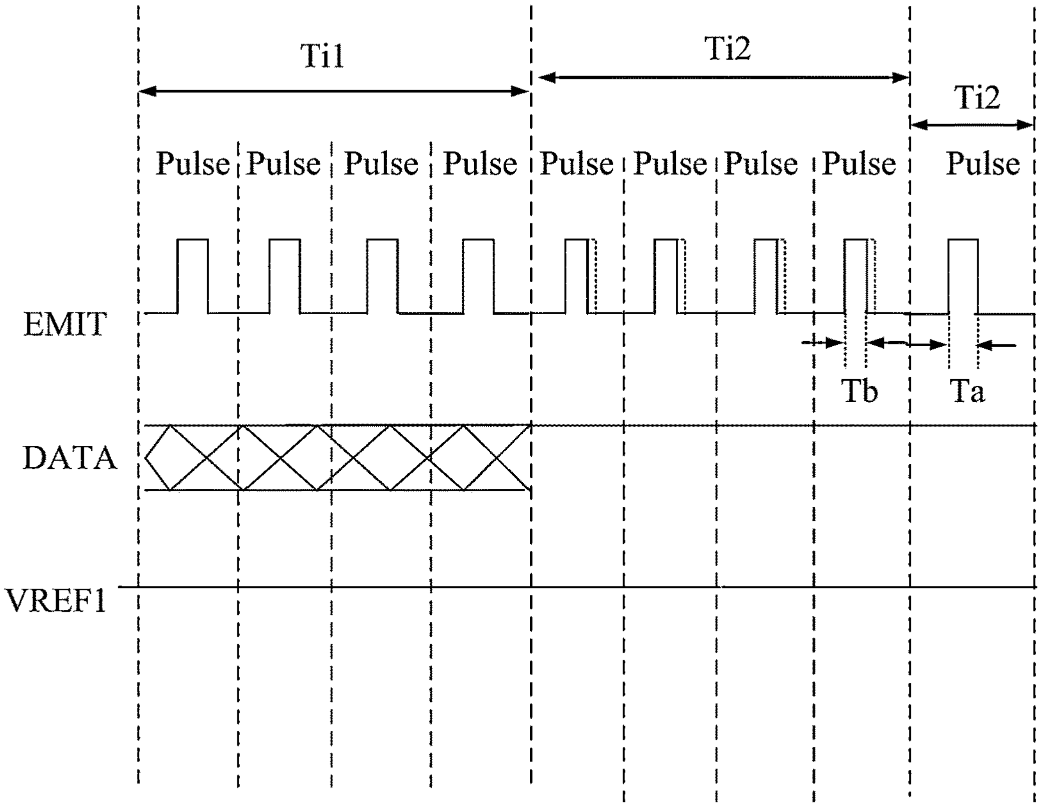
FIG. 19 is another drive timing diagram of a display panel according to an embodiment of the present invention.

FIG. 19 is another drive timing diagram of a display panel according to an embodiment of the present invention. As shown in FIG. 19, when the N-th second display stage Ti2 includes one display sub-stage, the first one of the display sub-stages and the last one of the display sub-stages are the same display sub-stage. In this case, the ineffective pulse duration for the light emission control signal EMIT in the display sub-stage in the N-th second display stage Ti2 is Ta. The ineffective pulse duration for the light emission control signal EMIT in the last display sub-stage in the (N−1)-th second display stage Ti2 is Tb. Similarly, the effective pulse duration for the light emission control signal EMIT in the last display sub-stage in the last one of the second display stages Ti2 in one display period is reduced, reducing a sudden change in the brightness-level of the display panel during the frequency switch. In some embodiments, the effective pulse duration for the light emission control signal EMIT in the last display sub-stage in the last one of the second display stages Ti2 in one display period may be reduced to the same as the effective pulse duration for the light emission control signal EMIT in the first display stage Ti1.

Figure 20:
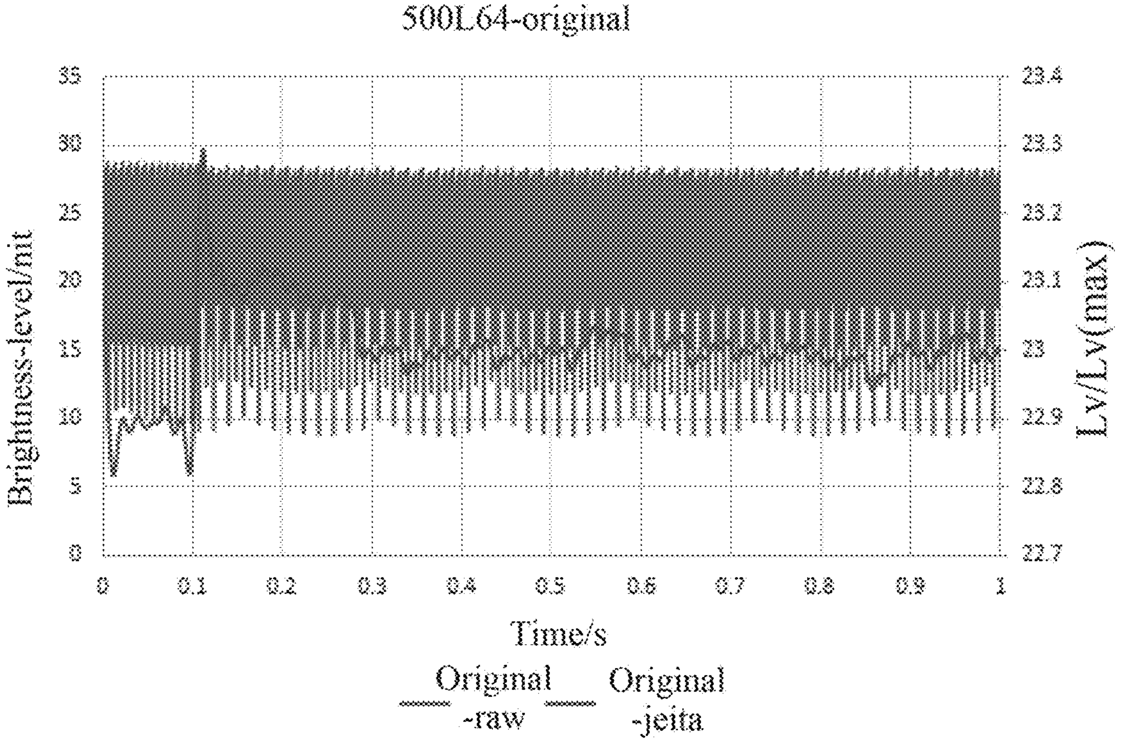
FIG. 20 is a diagram of the brightness-level effect without compensation reduction in the last display sub-stage in a display period according to an embodiment of the present invention.
Figure 21:
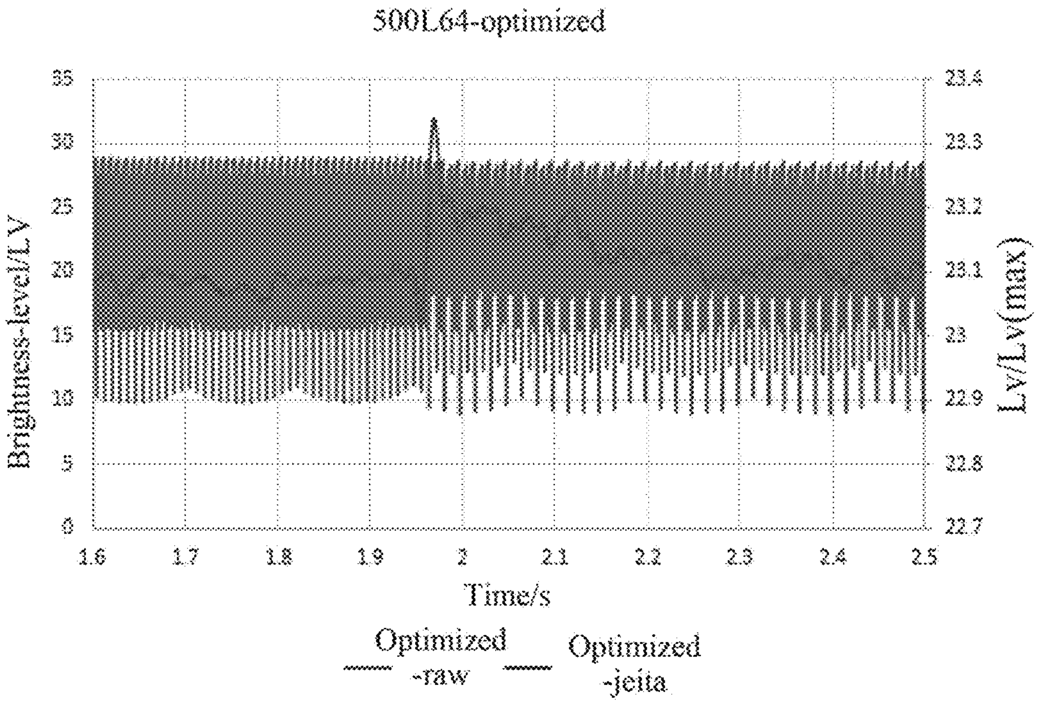
FIG. 21 is a diagram of the brightness-level effect with compensation reduction in the last display sub-stage in a display period according to an embodiment of the present invention.

FIG. 20 is a diagram of the brightness-level effect without compensation reduction in the last display sub-stage in a display period according to an embodiment of the present invention. FIG. 21 is a diagram of the brightness-level effect with compensation reduction in the last display sub-stage in a display period according to an embodiment of the present invention. It is assumed that brightness-level simulation is performed in the case of 500-nit L64. As shown in FIG. 20, an abscissa is a piece of time, and an ordinate is a brightness-level value. A dense pulse pattern (original-raw) in FIG. 20 is a diagram illustrating the effective pulse duration for the light emission control signal EMIT in the last display sub-stage in one display period (including the first display stage Ti1 and multiple second display stages Ti2 disposed in sequence) with no reduction. An oscillogram (original-jeita) is the real-time average brightness-level of multiple pixels and can represent the visual brightness-level effect. It can be seen that a fluctuation range of the oscillogram can reach 5 nits to 30 nits at the moment of the frequency switch, that is, the time point of 0.1 seconds in the figure. As shown in FIG. 21, a dense pulse pattern (optimized-raw) in FIG. 21 is a diagram illustrating the effective pulse duration for the light emission control signal EMIT in the last display sub-stage in one display period (including the first display stage Ti1 and multiple second display stages Ti2 disposed in sequence) with the reduction. An oscillogram (original-jeita) is the real-time average brightness-level of multiple pixels. It can be seen that a fluctuation range of the oscillogram can reach 15 nits to 30 nits at the moment of the frequency switch, that is, the time point of 2 seconds in the figure and that a brightness-level difference before and after the switch is relatively small, with the effect at least not worse than the effect shown in FIG. 20. Accordingly, when the last display sub-stage in one display period is controlled separately, a compensation value of the effective pulse for the light emission control signal EMIT is reduced so as to further reduce a brightness-level vibration amplitude during the frequency switch and mitigate the flicker problem. Moreover, because the last display sub-stage occupies a small proportion in the entire display period, the brightness-level difference before and after the frequency switch is not deteriorated, further improving the display effect.

Figure 22:
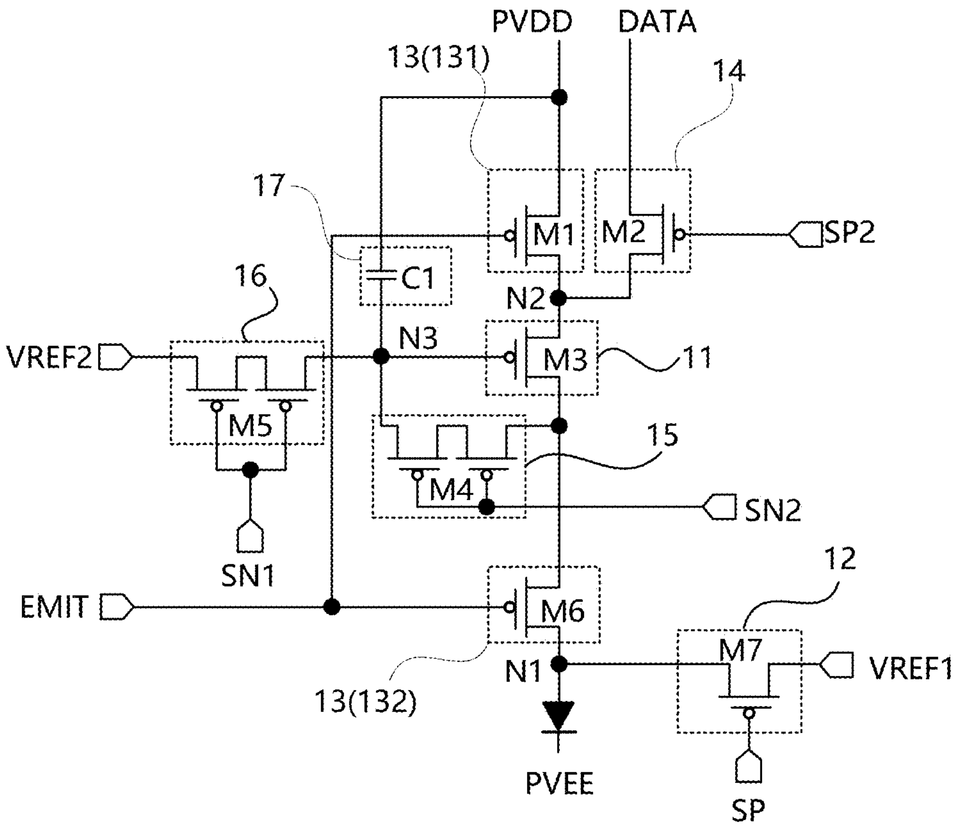
FIG. 22 is a structural diagram of another pixel circuit according to an embodiment of the present invention.
Figure 23:
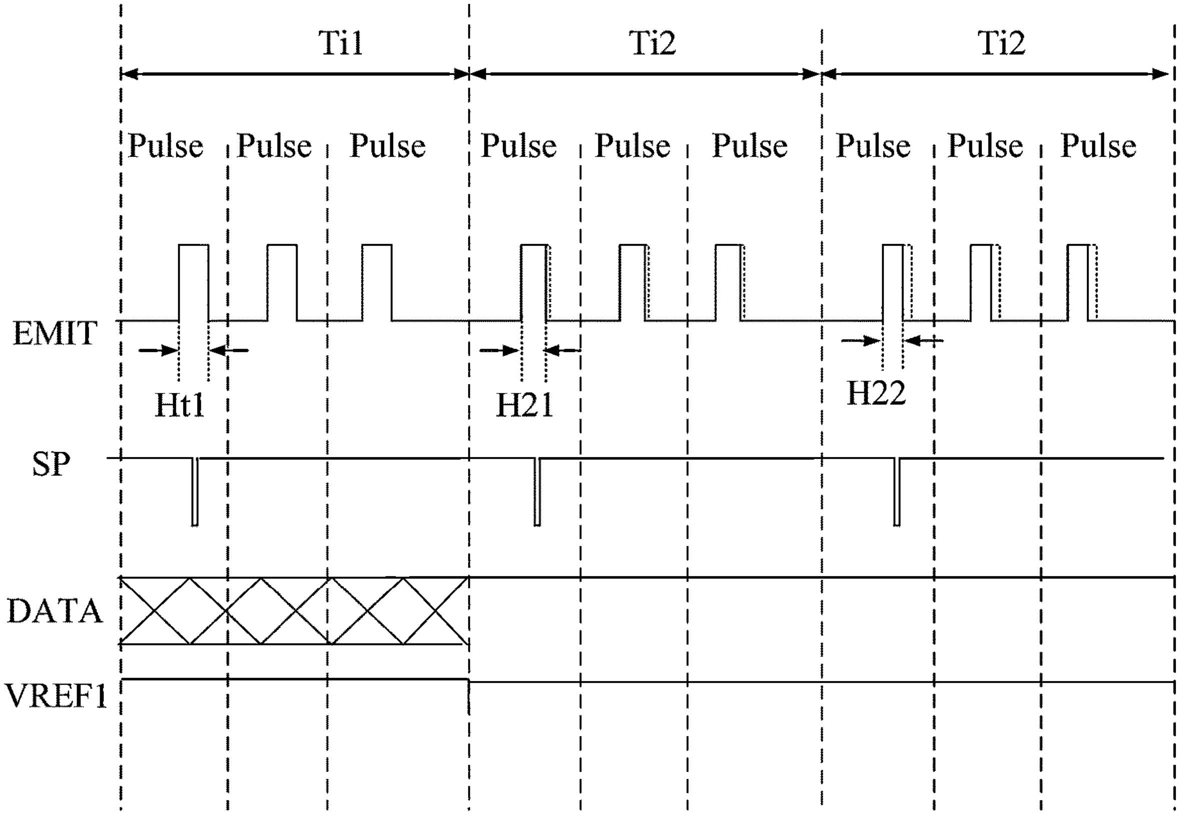
FIG. 23 is another drive timing diagram of a display panel according to an embodiment of the present invention.

FIG. 22 is a structural diagram of another pixel circuit according to an embodiment of the present invention. FIG. 23 is another drive timing diagram of a display panel according to an embodiment of the present invention. In some embodiments, the display panel may further include a first initialization module 12. The first initialization module 12 is configured to supply a first initialization voltage VREF1 to a first node N1. The first node N1 is connected to the light-emitting element. A control terminal of the first initialization module 12 is used for transmitting the first initialization voltage VREF1 to the first node N1 in response to a first scan control signal SP. In the first display stage Ti1 and a second display stage Ti2, the period of an effective pulse for the first scan control signal SP is located within the period of an ineffective pulse for the light emission control signal EMIT.

The first initialization module 12 can transmit the first initialization voltage VREF1 to the first node N1 in response to the first scan control signal SP. In this embodiment, the first node N1 is connected to one of the anode of the light-emitting element 20 or the cathode of the light-emitting element 20 to perform reset for the light-emitting element 20. When the first node N1 is connected to the anode of the light-emitting element 20, the first initialization voltage VREF1 is negative. When the first node N1 is connected to the cathode of the light-emitting element 20, the first initialization voltage VREF1 is positive. An example in which the first node N1 is connected to the anode of the light-emitting element 20 is taken for describing this embodiment. It is to be noted that each display stage among the first display stage Ti1 and the second display stage Ti2 needs to be provided with at least one ineffective pulse for the first scan control signal SP so that the light-emitting element (first node N1) is reset at each display stage, effectively suppressing a continuous increase in the brightness-level of the light-emitting element in the second display stage Ti2 and effectively maintaining the stability of the displayed brightness-level. As shown in FIG. 23, whether in the first display stage Ti1 or the second display stage Ti2, the period of the effective pulse for the first scan control signal SP is located within the period of the ineffective pulse for the light emission control signal EMIT; that is, the reset of the light-emitting element 20 should be in a period in which the light-emitting element 20 does not emit light.

Figure 24:
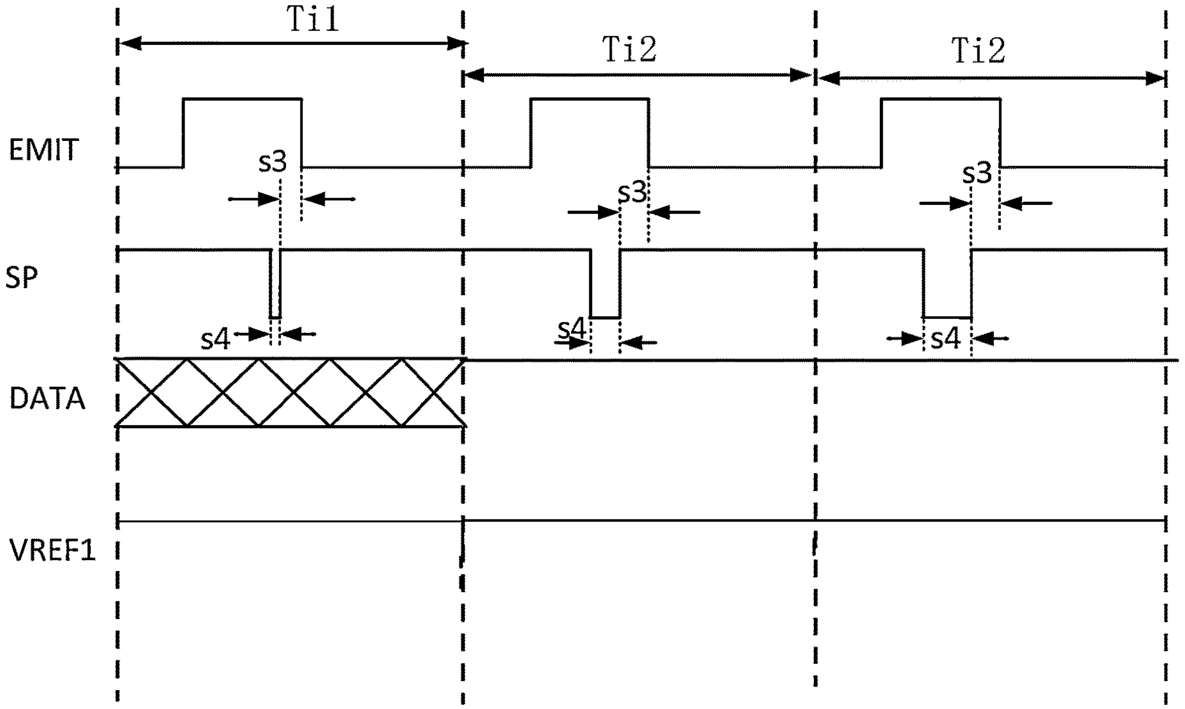
FIG. 24 is another drive timing diagram of a display panel according to an embodiment of the present invention.

FIG. 24 is another drive timing diagram of a display panel according to an embodiment of the present invention. In some embodiments, in each of the first display stage Ti1 and the second display stage Ti2, a preset delay is set between the end time of the effective pulse for the first scan control signal SP and the end time of the ineffective pulse for the light emission control signal EMIT corresponding to the first scan control signal SP. To clearly show the timing relationship between the first scan control signal SP and the light emission control signal EMIT, in this embodiment, only one ineffective pulse for the light emission control signal EMIT is exemplified in each display stage. In fact, each display stage may include at least one ineffective pulse for the light emission control signal EMIT. However, each display stage has one ineffective pulse for the light emission control signal EMIT covering the period of an effective pulse for the first scan control signal SP. It can be seen from the preceding embodiments that the period of the effective pulse for the first scan control signal SP is located within the period of the ineffective pulse for the light emission control signal EMIT. In this embodiment, a preset delay s3 is set between the end time of the effective pulse for the first scan control signal SP and the end time of the ineffective pulse for the light emission control signal EMIT corresponding to the first scan control signal SP. The light-emitting element can emit light normally after a time period from the reset of the light-emitting element, enhancing the reset effect of the light-emitting element, effectively restraining the brightness-level increase of the light-emitting element at a low greyscale, and avoiding the problem of a relatively large brightness-level change of the display panel during the frequency switch.

With continued reference to FIG. 24, in some embodiments, in two second display stages Ti2, a ratio of an effective pulse duration s4 of the first scan control signal SP to an ineffective pulse duration for the light emission control signal EMIT corresponding to the first scan control signal SP in one of the two second display stages Ti2 is different from a ratio of an effective pulse duration s4 of the first scan control signal SP to an ineffective pulse duration for the light emission control signal EMIT corresponding to the first scan control signal SP in the other one of the two second display stages Ti2. The brightness-level of the display panel increases with an increase in the light emission duration. The second display stages Ti2 are located after the first display stage Ti1. Accordingly, the brightness-level of the second display stages Ti2 is easy to increase. In this embodiment, the durations of the effective pulses in the second display stages Ti2 may be controlled independently. For example, the reset duration of the light-emitting element may be prolonged by increasing the effective pulse duration of the first scan control signal SP in part of the second display stages Ti2, thereby effectively suppressing the brightness-level increase of the light-emitting element and maintaining the brightness-level of the display panel to be stable in a set range. In an example, as shown in FIG. 24, two second display stages Ti2 exist. The proportions of the durations s4 of the effective pulses of the first scan control signal SP in the ineffective pulses for the light emission control signal EMIT corresponding to the first scan control signal SP are different. In some embodiments, when multiple second display stages Ti2 exist, the proportions of the durations s4 of the effective pulses of the first scan control signal SP in the ineffective pulses for the light emission control signal EMIT corresponding to the first scan control signal SP may increase gradually, thereby gradually enhancing the effect of suppressing the brightness-level of the light-emitting element and effectively avoiding the problem of a large brightness-level difference or a flicker during the frequency switch.

With continued reference to FIG. 24, in some embodiments, the duration of the preset delay s3 in the first display stage Ti1 is shorter than the duration of the preset delay s3 in the second display stage Ti2. The brightness-level of the display panel may increase with an increase in the light emission duration. The second display stage Ti2 is located after the first display stage Ti1. Accordingly, the brightness-level of the second display stage Ti2 is easy to increase. In this embodiment, the preset delay existing between the light emission duration of the light-emitting element and the reset time in the second display stage Ti2 may be controlled to be different from the preset delay existing between the light emission duration of the light-emitting element and the reset time in the first display stage Ti1. The duration of the preset delay s3 in the second display stage Ti2 is controlled to be longer than the duration of the preset delay s3 in the first display stage Ti1, thereby enhancing the reset effect of the anode of the light-emitting element in the second display stage Ti2, effectively preventing the displayed brightness-level from increasing, and maintaining the stability of the brightness-level of the light-emitting element at a low greyscale.

Figure 25:
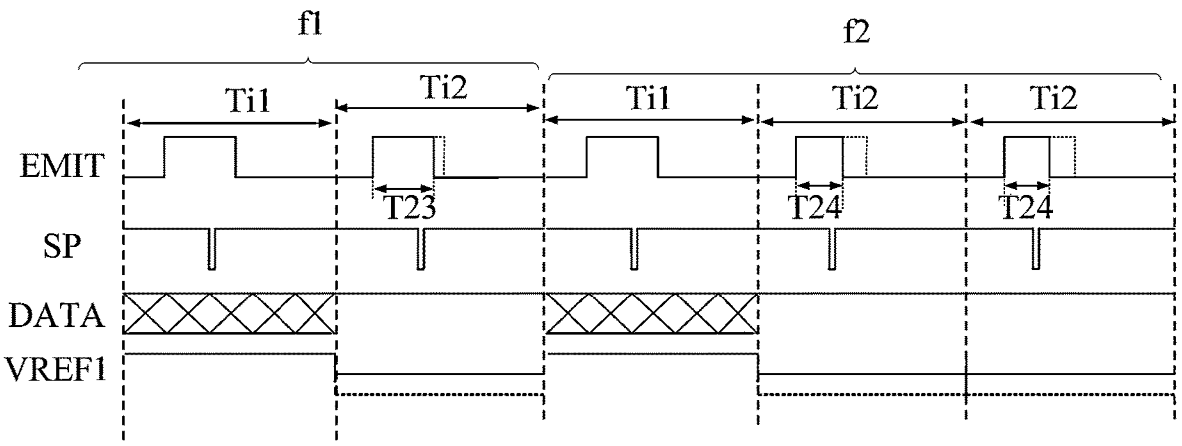
FIG. 25 is another drive timing diagram of a display panel according to an embodiment of the present invention.

FIG. 25 is another drive timing diagram of a display panel according to an embodiment of the present invention. In some embodiments, when a drive frequency of the at least one pixel circuit is a first frequency f1, the ineffective pulse duration for the light emission control signal EMIT in the second display stage Ti2 is T23, and when the drive frequency of the at least one pixel circuit is a second frequency f2, the ineffective pulse duration for the light emission control signal in the second display stage Ti2 is T24, where f1>f2 and T23>T24.

When the frequency is changed by using the frame insertion method or the pulse insertion method, a lower frequency indicates the longer time the at least one light-emitting element maintains the displayed brightness-level of a current data signal Data. When the refresh frequency of the display panel is set to the first frequency f1, the total duration of an effective pulse for the light emission control signal EMIT in the second display stage Ti2 is controlled as T23. When the refresh frequency of the display panel is set to the second frequency f2, the total duration of the effective pulse for the light emission control signal EMIT in the second display stage Ti2 is controlled as T24. FIG. 25 only exemplifies the case where each display stage includes one display sub-stage (pulse). When f1>f2, it indicates that the brightness-level maintaining time of the at least one light-emitting element is longer in the case of the second frequency f2. In this case, the problem of an excessive increase in the displayed brightness-level is more likely to occur. This embodiment may control that T23<T24, effectively balancing the displayed brightness-level of the at least one light-emitting element in the case of different refresh frequencies. In this case, when the frequency of the display panel is switched, for example, when the first frequency f1 is switched to the second frequency f2, human eyes are not easy to feel a change in the displayed brightness-level and a flicker.

With continued reference to FIGS. 22 and 24, in some embodiments, the display panel may further include a data write module 14 and a threshold compensation module 15. The data write module 14 is configured to supply a data signal to a first terminal of the drive module 11. The threshold compensation module 15 is connected between a control terminal of the drive module 11 and a second terminal of the drive module. The data signal in the first display stage is D1, and the data signal in the second display stage is D2, where |D1|<|D2|.

In this embodiment, the pixel circuit further includes the data write module 14 and the threshold compensation module 15. In the first display stage Ti1, the data write module 14 writes the data signal into the first terminal of the drive module 11 first. Then the data signal can be written into the control terminal of the drive module 11 through the threshold compensation module 15. In the second display stage Ti2, the data write module 14 only writes the data signal into the first terminal of the drive module 11, while the threshold compensation module 15 is turned off. Accordingly, the data signal is controlled to reset the drive module 11, that is, to reset a second node N2. The data signal in the first display stage is D1. The data signal in the second display stage is D2. In this embodiment, |D1|<|D2|. Accordingly, a difference between the biasing state of the drive module 11 in the second display stage Ti2 and the biasing state of the drive module 11 in the first display stage Ti1 is reduced, reducing the displayed brightness at a low refresh rate and especially the displayed brightness of a low grayscale. The data signal in the first display stage is D1. The data signal in the second display stage is D2. In this embodiment, |D1|<|D2|. Accordingly, the difference between the biasing state of the drive module 11 in the second display stage Ti2 and the biasing state of the drive module 11 in the first display stage Ti1 is reduced, reducing the displayed brightness-level at a low refresh rate, especially the displayed brightness-level at a low greyscale. In the first display stage Ti1, the data signal D1 is a voltage signal that is variable according to the display screen. The data signal D2 may be a constant voltage. In this case, when the display panel is in the second display stage Ti2, a driver chip supplies a constant voltage to the data write module 14, thereby simplifying a working module of the driver chip. Of course, in this embodiment, the data signal D2 may also be a variable voltage signal as long as it is satisfied that the data signal D2 is greater than the data signal D1.

Figure 26:
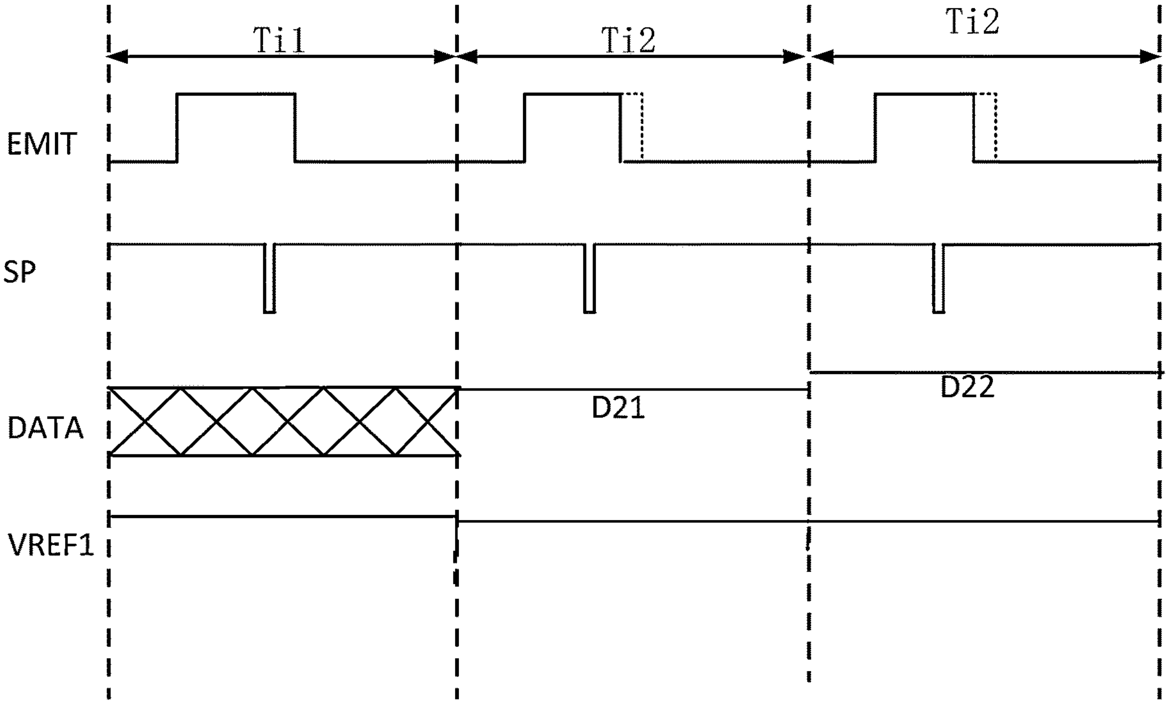
FIG. 26 is another drive timing diagram of a display panel according to an embodiment of the present invention.

FIG. 26 is another drive timing diagram of a display panel according to an embodiment of the present invention. In some embodiments, the display period of the display panel includes the first display stage Ti1 and N second display stages Ti2. The first one of the N second display stages Ti2 is adjacent to the first display stage Ti1. In the q-th second display stage, the data signal is D21, and in the (q+1)-th second display stage, the data signal is D22, where |D21|<|D22|, 1≤q≤N−1, and q is an integer.

When a high frequency is switched to a low frequency, the more the second display stages Ti2, the longer the duration of the second display stages Ti2. In this case, the biasing state of the second node N2 of the drive module 11 may be further offset. When the display period includes multiple second display stages Ti2, the data signal D22 in the (q+1)-th second display stage Ti2 is controlled to be greater than the data signal D21 in the q-th second display stage Ti2. Accordingly, the difference between the biasing state of the drive module 11 in the second display stage Ti2 and the biasing state of the drive module 11 in the first display stage Ti1 may be reduced gradually in each display period, gently reducing the brightness-level of the light-emitting element and finally maintaining the stability of the displayed brightness-level during the frequency switch of the display panel.

Figure 27:
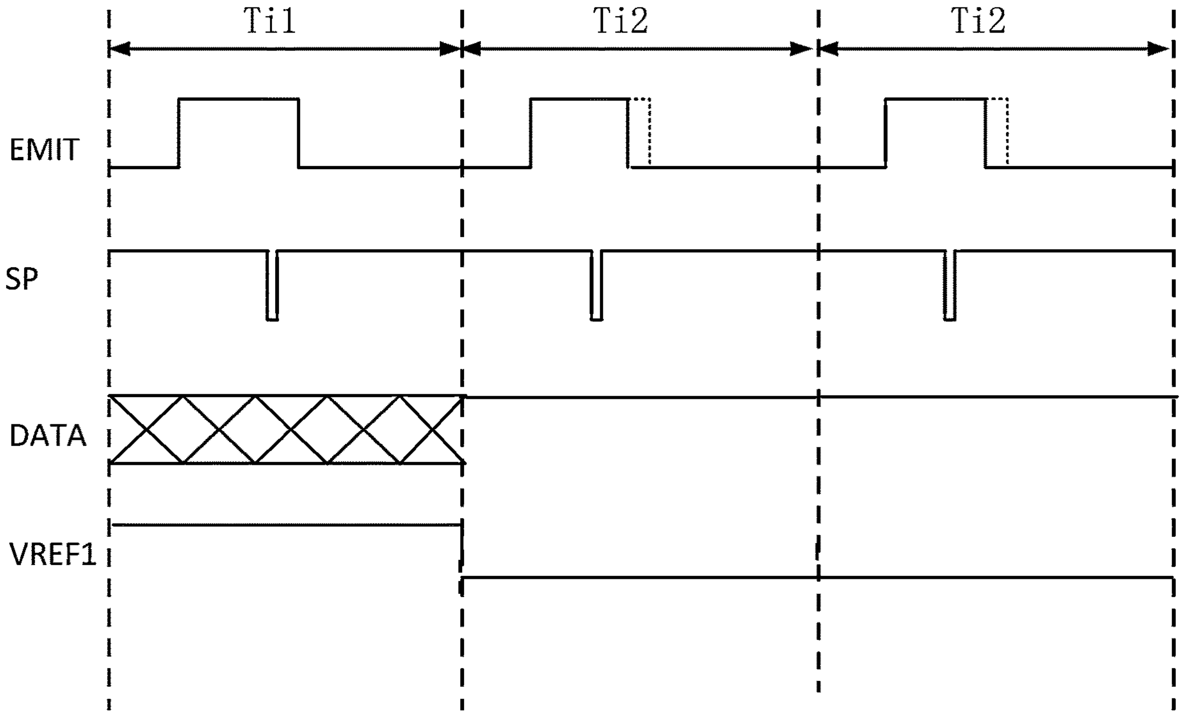
FIG. 27 is another drive timing diagram of a display panel according to an embodiment of the present invention.

FIG. 27 is another drive timing diagram of a display panel according to an embodiment of the present invention. In some embodiments, the first initialization voltage in the first display stage Ti1 is V1, and the first initialization voltage in the second display stage Ti2 is V2, where |V1|<|V2|.

When the anode of the light-emitting element is reset, the first initialization voltage is negative, and V1>V2. When the cathode of the light-emitting element is reset, the first initialization voltage is positive, and V1<V2. An example is taken in which the anode of the light-emitting element is reset. The speed for charging the light-emitting element 20 is adjusted by setting the first initialization voltage VREF1. In embodiments of the present invention, the voltage value V2 of the first initialization voltage in the second display stage Ti2 is pulled down, the voltage value of the anode of the light-emitting element 20 is lowered, the drive current is decreased, and the brightness-level of the light-emitting element 20 is reduced so that the brightness-level in the dark state is reduced in completion of the frequency switch, lowering the displayed brightness-level at a low refresh rate at a low greyscale, reducing a difference between the displayed brightness-level at a high refresh rate at a low greyscale and the displayed brightness-level at a low refresh rate at a low greyscale, and improving the display effect of the display panel.

Figure 28:
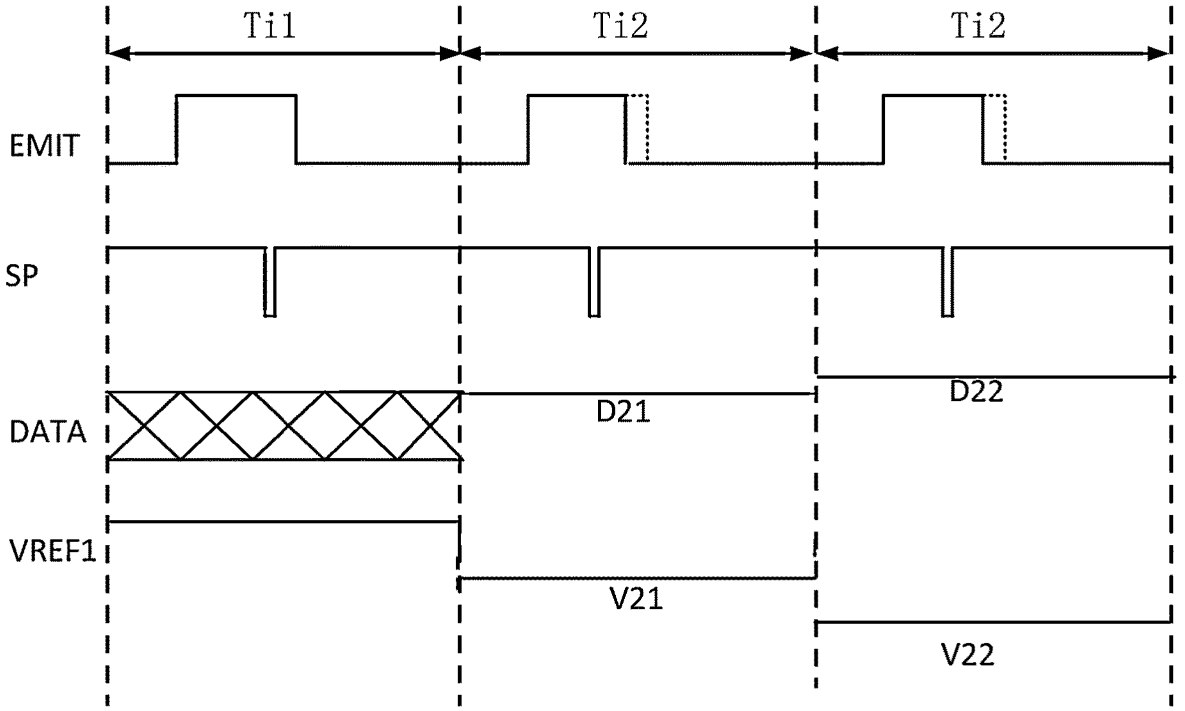
FIG. 28 is another drive timing diagram of a display panel according to an embodiment of the present invention.

FIG. 28 is another drive timing diagram of a display panel according to an embodiment of the present invention. In some embodiments, the display period of the display panel includes the first display stage Ti1 and N second display stages Ti2. The first one of the N second display stages Ti2 is adjacent to the first display stage Ti1. In the r-th second display stage Ti2, the first initialization voltage is V21, and in the (r+1)-th second display stage Ti2, the first initialization voltage is V22, where |V21|<|V22|, 1≤r≤N−1, and r is an integer.

The first one of the second display stages Ti2 may be configured to be adjacent to the first display stage Ti1. In this case, in this embodiment, it may be further configured that the absolute value of V2 of the first initialization voltage gradually increases from the first one of the second display stages Ti2 to the last one of the second display stages Ti2. The total number of the second display stages Ti2 is N. The first initialization voltage in the r-th second display stage Ti2 is V21. The first initialization voltage in the (r+1)-th second display stage Ti2 is V22. |V21|<|V22|. In principle, the leakage degree of the pixel circuit in the (r+1)-th second display stage Ti2 is greater than the leakage degree of the r-th second display stage Ti2. In this case, the data signal of the (r+1)-th second display stage Ti2 is increased, the first initialization voltage is lowered, the voltage value of the anode of the light-emitting element 20 is lowered, the drive current is decreased, the brightness-level of the light-emitting element 20 is reduced, and a difference between displayed brightness-levels during the frequency switch are reduced, improving the display effect of the display panel.

In some embodiments, a difference between the first initialization voltage V1 in the first display stage Ti1 and the first initialization voltage V2 in a second display stage Ti2 is a first difference S1. A difference between the first initialization voltage V21 in the r-th second display stage Ti2 and the first initialization voltage V22 in the (r+1)-th second display stage Ti2 is a second difference S2. The first difference S1 is greater than or equal to the second difference S2.

A voltage drop from the first initialization voltage V1 of the first display stage Ti1 to the first initialization voltage V2 of the second display stage Ti2 is the first difference S1. A voltage drop from the first initialization voltage V21 of the r-th second display stage Ti2 to the first initialization voltage V22 of the (r+1)-th second display stage Ti2 is the second difference S2. The first difference S1 may be the same as the second difference S2, thereby reducing the design requirements for a drive circuit in the display panel.

In other embodiments, as time goes on and the leakage continues, the leakage current of a transistor is smaller and smaller. The voltage drop from the first initialization voltage V1 of the first display stage Ti1 to the first initialization voltage V2 of the second display stage Ti2 is relatively large. The voltage drop from the first initialization voltage V21 of the r-th second display stage Ti2 to the first initialization voltage V22 of the (r+1)-th second display stage Ti2 is relatively small. In this case, the stability of the displayed brightness is maintained.

With continued reference to FIG. 22, in some embodiments, the display panel may further include a second initialization module 16 and a storage module 17. The second initialization module 16 is configured to connect to a second initialization voltage VREF2 and the control terminal of the drive module 11. The storage module 17 is connected between the control terminal of the drive module 11 and the first power signal PVDD. A control terminal of the data write module 14 is configured to receive a second scan control signal SP2. A control terminal of the second initialization module 16 is configured to receive a third scan control signal SN1. A control terminal of the threshold compensation module 15 is configured to receive a fourth scan control signal SN2. In the first display stage Ti1, the first scan control signal SP is used for controlling the first initialization module 12 to be turned on, the second scan control signal SP2 is used for controlling the data write module 14 to be turned on, the third scan control signal SN1 is used for controlling the second initialization module 16 to be turned on, and the fourth scan control signal SN2 is used for controlling the threshold compensation module 15 to be turned on. In the second display stage Ti2, the first scan control signal SP is used for controlling the first initialization module 12 to be turned on, and the second scan control signal SP2 is used for controlling the data write module 14 to be turned on.

Figure 29:
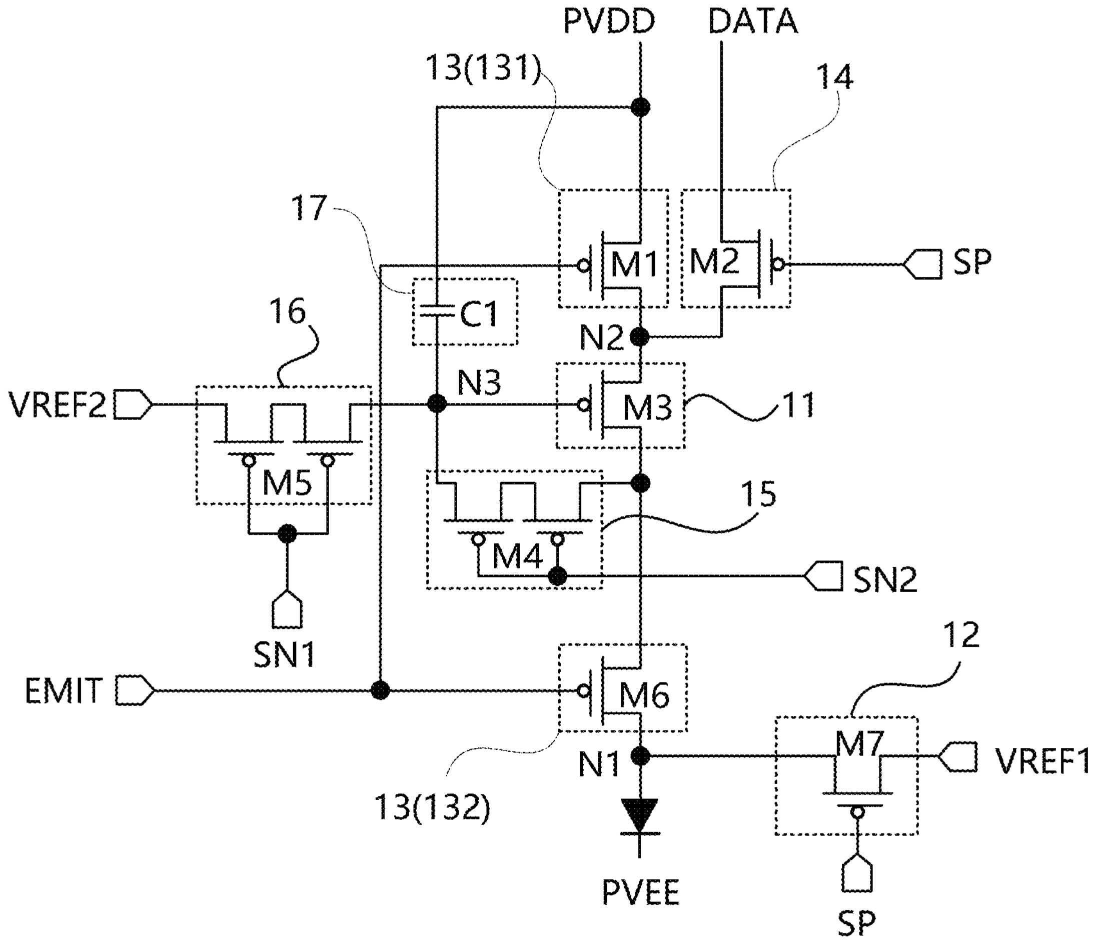
FIG. 29 is a structural diagram of another pixel circuit according to an embodiment of the present invention.
Figure 30:
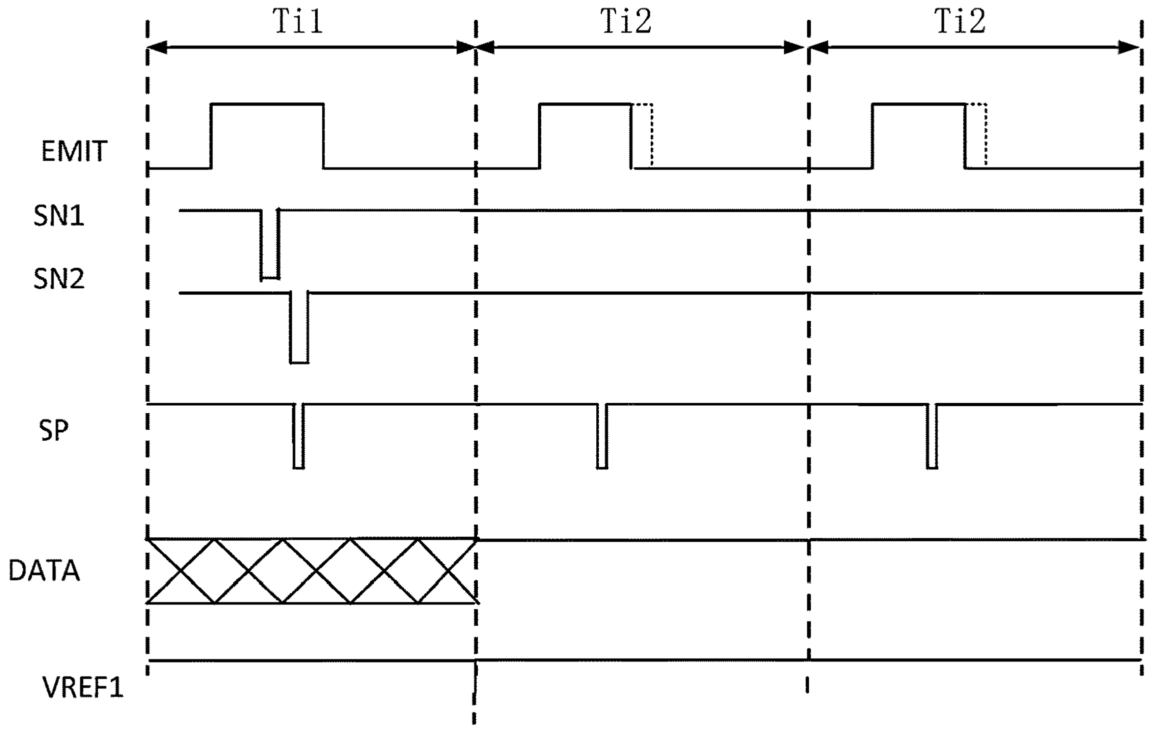
FIG. 30 is another drive timing diagram of a display panel according to an embodiment of the present invention.
Figure 31:
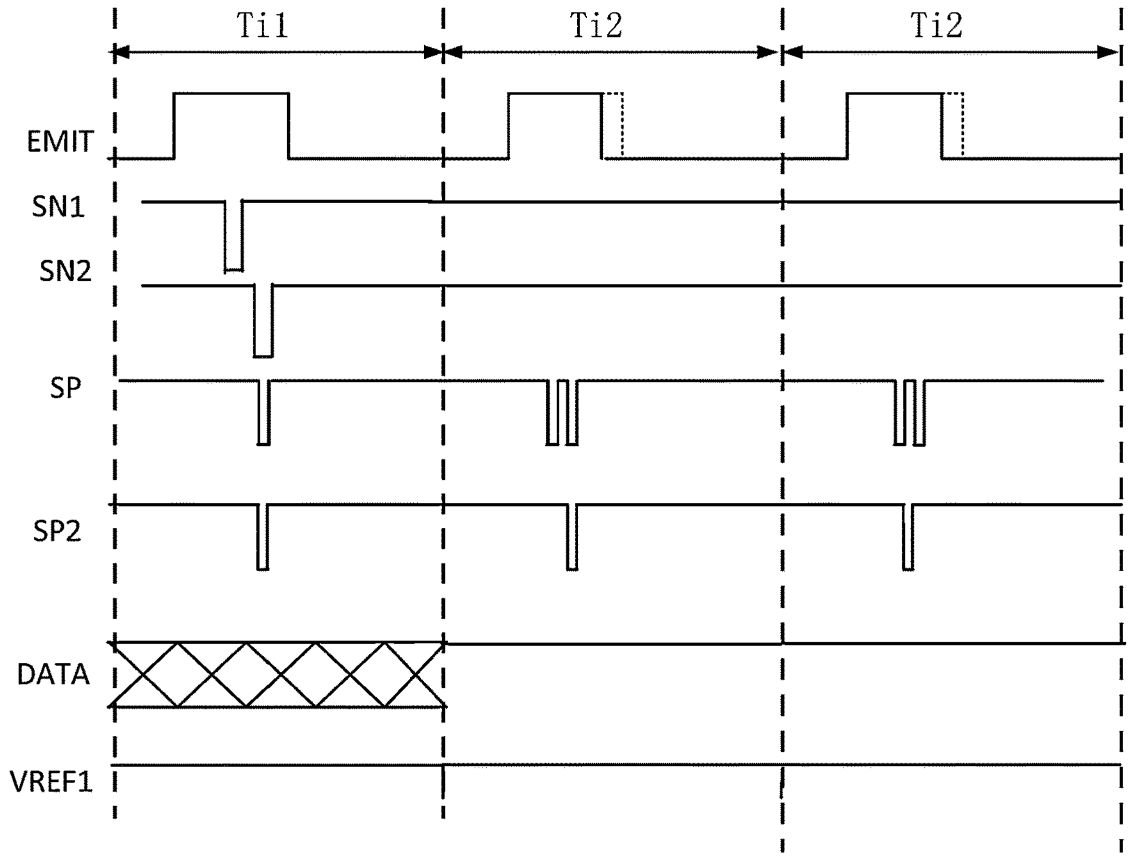
FIG. 31 is another drive timing diagram of a display panel according to an embodiment of the present invention.

FIG. 29 is a structural diagram of another pixel circuit according to an embodiment of the present invention. As shown in FIG. 29, in this embodiment, the first scan control signal and the second scan control signal may be the same signal, that is, the first scan control signal SP. The timing diagram in this case may be shown in FIG. 30. FIG. 30 is another drive timing diagram of a display panel according to an embodiment of the present invention. In the first display stage Ti1, the first scan control signal SP controls the first initialization module 12 and the data write module 14 to be turned on, the third scan control signal SN1 controls the second initialization module 16 to be turned on, and the fourth scan control signal SN2 controls the threshold compensation module 15 to be turned on. In the second display stage Ti2, the first scan control signal SP controls the first initialization module 12 and the data write module 14 to be turned on, and the second initialization module 16 and the threshold compensation module 15 are no longer turned on. To reset the first node N1 and the second node N2 separately, in this embodiment, the turning-on of the first initialization module 12 is controlled by the first scan control signal SP, and the turning-on of the data write module 14 is controlled by the second scan control signal SP2. As shown in FIG. 31, FIG. 31 is another drive timing diagram of a display panel according to an embodiment of the present invention. In the first display stage Ti1, the first scan control signal SP controls the first initialization module 12 to be turned on, the second scan control signal SP2 controls the data write module 14 to be turned on, the third scan control signal SN1 controls the second initialization module 16 to be turned on, and the fourth scan control signal SN2 controls the threshold compensation module 15 to be turned on. In the second display stage Ti2, the first scan control signal SP controls the first initialization module 12 to be turned on, and the second scan control signal SP2 controls the data write module 14 to be turned on. As shown in FIG. 31, when the light-emitting element, that is, the first node N1, needs to be reset, the reset may be performed through the first scan control signal SP. Additionally, the reset time in the second display stage Ti2 is increased, thereby enhancing the reset effect for the light-emitting element and effectively avoiding the brightness-level of each sub-pixel from exceeding a reasonable range. Moreover, when the second node N2 is reset, the reset duration of the second node N2 in the second display stage Ti2 may be smaller than the reset duration of the first node N1, preventing a current from flowing back from the second node N2 into the first power signal PVDD in a reset process of the second node N2 and causing a waste of electricity.

In some embodiments, with continued reference to FIG. 31, when the turning-on of the first initialization module 12 is controlled through the first scan control signal SP and the turning-on of the data write module 14 is controlled through the second scan control signal SP2, an effective pulse for the first scan control signal SP partially overlaps an effective pulse for the third scan control signal SN1, and an effective pulse for the second scan control signal SP2 partially overlaps an effective pulse for the fourth scan control signal SN2.

It is to be noted that the width of the effective pulse for the first scan control signal SP and the width of the effective pulse for the second scan control signal SP2 are smaller than the width of the effective pulse for the third scan control signal SN1 and the width of the effective pulse for the fourth scan control signal SN2 to improve the reset control flexibility of the first scan control signal SP and the second scan control signal SP2. For example, the width of the effective pulse for the third scan control signal SN1 and the width of the effective pulse for the fourth scan control signal SN2 are at least 4 times of row time. Each piece of row time is the scan time of sub-pixels in each row. The scan time of sub-pixels in each row=effective-frame time/total number of rows. In this case, the width of the effective pulse for the first scan control signal SP and the width of the effective pulse for the second scan control signal SP2 are at least 2 times of row time. Then the width of the effective pulse for the third scan control signal SN1 and the width of the effective pulse for the fourth scan control signal SN2 are 4 times of row time, 8 times of row time, 12 pieces of the row time, and the like. The first scan control signal SP and the second scan control signal SP2 may implement 2 times of row time, 4 times of row time, 6 times of row time, and the like, enhancing the accuracy of the first scan control signal SP controlling the reset duration of the at least one light-emitting element and improving the accuracy of controlling the display brightness-level of each pixel.

Figure 32:
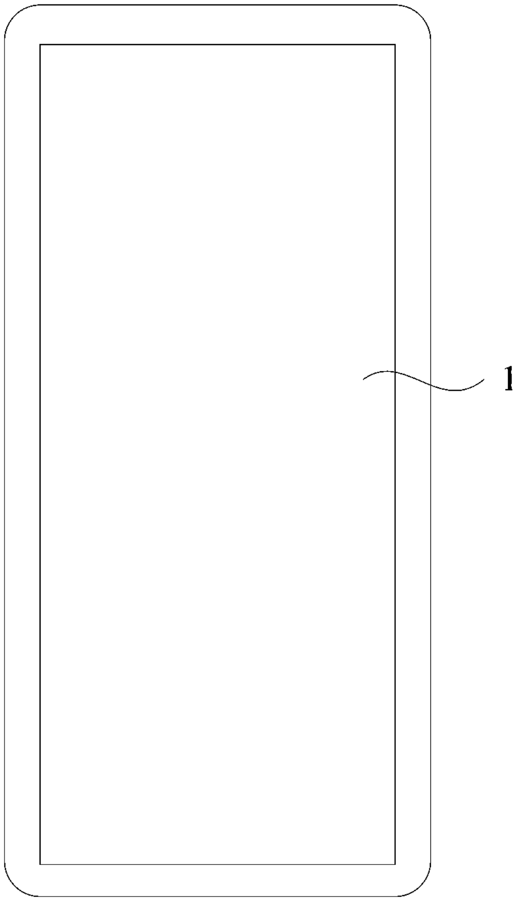
FIG. 32 is a structural diagram of a display device according to an embodiment of the present invention.

Embodiments of the present invention further provide a display device to reduce a bright-level difference in a refresh frequency switching process of the display panel and mitigate a flicker problem. FIG. 32 is a structural diagram of a display device according to an embodiment of the present invention. As shown in FIG. 32, the display device in embodiments of the present invention includes the display panel 1 of any embodiment of the present invention. The display device may be a mobile phone as shown in FIG. 32, or may be a computer, a television, a smart wearable device or the like, which is not limited in the embodiment.

The display device provided in embodiments of the present invention includes all the technical features of the display panel provided by any embodiment of the present invention and has the beneficial effects of the corresponding features.

What is claimed is:

1. A display panel, comprising at least one pixel circuit and at least one light-emitting element, wherein the at least one pixel circuit is configured to drive the at least one light-emitting element to emit light;

a pixel circuit of the at least one pixel circuit comprises a drive module and a light emission control module, the drive module is configured to generate a drive current, and the light emission control module is configured to control the drive current to be transmitted to a light-emitting element of the at least one light-emitting element in response to a light emission control signal; and a display period of the display panel comprises a first display stage and a second display stage;

in the first display stage, an ineffective pulse duration for the light emission control signal is T1; and in the second display stage, an ineffective pulse duration for the light emission control signal is T2; wherein T1>T2; and wherein the display panel further comprises a first initialization module, the first initialization module is configured to supply a first initialization voltage to a first node, the first node is connected to the light-emitting element, and a control terminal of the first initialization module is used for transmitting the first initialization voltage to the first node in response to a first scan control signal; and in the first display stage and the second display stage, a period of an effective pulse for the first scan control signal is located within a period of an ineffective pulse for the light emission control signal.

2. The display panel according to claim 1, wherein the display period of the display panel comprises the first display stage and a plurality of second display stages; and ineffective pulse durations for the light emission control signal in the plurality of second display stages are same.

3. The display panel according to claim 1, wherein the display period of the display panel comprises the first display stage and a plurality of second display stages, and ineffective pulse durations for the light emission control signal in at least two of the plurality of second display stages are different; and wherein the display period of the display panel comprises the first display stage and N second display stages, and N is an integer greater than or equal to 2, a first one of the second display stages of the N second display stages is adjacent to the first display stage, in an i-th second display stage of the N second display stages, an ineffective pulse duration for the light emission control signal is T21, and in an (i+1)-th second display stage of the N second display stages, an ineffective pulse duration for the light emission control signal is T22; wherein T21>T22, 1≤i≤N−1, and i is an integer.

4. The display panel according to claim 3, wherein the first display stage comprises c display sub-stages and a second display stage of the N second display stages comprises c display sub-stages, each of the c display sub-stages comprises one ineffective pulse for the light emission control signal, and c is an integer greater than or equal to 1.

5. The display panel according to claim 4, wherein c is an integer greater than or equal to 2;

in a same first display stage or in a same second display stage of the N second display stages, ineffective pulse widths for the light emission control signal in the c display sub-stages are same; and in two adjacent second display stages of the N second display stages, a difference between ineffective pulse widths for the light emission control signal is E, and wherein E=H21−H22, H21 and H22 are the ineffective pulse widths for the light emission control signal in the two adjacent second display stages respectively, 2L≤E≤8L, L is a row time at a current drive frequency f of the pixel circuit, L=1/(f×b), and b is a total number of rows of subpixels in the pixel circuit of the display panel.

6. The display panel according to claim 5, wherein an effective pulse width for the light emission control signal in each display sub-stage in a first one of the second display stages of the N second display stages is increased by H1 with relative to an effective pulse width for the light emission control signal in each display sub-stage in the first display stage, wherein $$H1 = \frac{b \times a\%}{C},$$

and a % denotes a brightness-level reduction value when a drive frequency of the pixel circuit is reduced from a fundamental frequency to the current drive frequency f; and an effective pulse width for the light emission control signal in each display sub-stage in a p-th second display stage of the N second display stages is increased by Hp with relative to the effective pulse width for the light emission control signal in the each display sub-stage in the first display stage, wherein $$Hp = \frac{b \times a\%}{C} + (p-1) \times E,\ 2 \le p \le N,$$

and p is an integer.

7. The display panel according to claim 4, wherein in a same second display stage of the N second display stages, ineffective pulse widths for the light emission control signal in two of the c display sub-stages are different, and wherein in the same second display stage, an ineffective pulse width for the light emission control signal in an m-th display sub-stage is Hm, and an ineffective pulse width for the light emission control signal in an (m+1)-th display sub-stage is H(m+1), and wherein Hm>H(m+1), 1≤m≤c−1, and m is an integer.

8. The display panel according to claim 3, wherein at least one of the first display stage or at least one of the N second display stages each comprises c1 display sub-stages, each of the c1 display sub-stages comprises one ineffective pulse for the light emission control signal, and c1 is an integer greater than or equal to 2; and at least one of the N second display stages comprises c2 display sub-stages, and c2 is greater than or equal to 1.

9. The display panel according to claim 3, wherein the first display stage comprises a plurality of display sub-stages, a second display stage of the N second display stages comprises at least one display sub-stage, and the plurality of display sub-stages comprised in the first display stage and the at least one display sub-stage comprised in the second display stage each comprise one ineffective pulse for the light emission control signal; and in an N-th second display stage of the N second display stages, a first one of the at least one display sub-stage is adjacent to an (N−1)-th second display stage, an ineffective pulse duration for the light emission control signal in a last one of the at least one display sub-stage is Ta; and an ineffective pulse duration for the light emission control signal in a display sub-stage adjacent to the last one of the at least one display sub-stage is Tb; wherein $Ta>Tb$.

10. The display panel according to claim 1, wherein in each of the first display stage and the second display stage, a preset delay is set between an end time of the effective pulse for the first scan control signal and an end time of the ineffective pulse for a light emission control signal corresponding to the first scan control signal, wherein a duration of the preset delay in the first display stage is shorter than a duration of the preset delay in the second display stage.

11. The display panel according to claim 1, wherein the display period of the display panel comprises the first display stage and a plurality of second display stages, and in two second display stages of the plurality of second display stages, a ratio of an effective pulse duration of the first scan control signal to an ineffective pulse duration for the light emission control signal corresponding to the first scan control signal in one of the two second display stages is different from a ratio of an effective pulse duration of the first scan control signal to an ineffective pulse duration for the light emission control signal corresponding to the first scan control signal in another one of the two second display stages.

12. The display panel according to claim 1, wherein when a drive frequency of the at least one pixel circuit is a first frequency f1, an ineffective pulse duration for the light emission control signal in the second display stage is T23; and when the drive frequency of the at least pixel circuit is a second frequency f2, the ineffective pulse duration for the light emission control signal in the second display stage is T24; wherein $f1>f2$, and $T23>T24$.

13. The display panel according to claim 1, further comprising a data write module and a threshold compensation module, wherein the data write module is configured to supply a data signal to a first terminal of the drive module, and the threshold compensation module is connected between a control terminal of the drive module and a second terminal of the drive module; and wherein the data signal in the first display stage is D1, and the data signal in the second display stage is D2, wherein $|D1|<|D2$.

14. The display panel according to claim 13, wherein the display period of the display panel comprises the first display stage and N second display stages;

a first one of the N second display stages is adjacent to the first display stage; and in a q-th second display stage of the N second display stages, the data signal is D21, and in a (q+1)-th second display stage of the N second display stages, the data signal is D22, wherein $|D21|<|D22|$, $1\le q\le N-1$, and q is an integer.

15. The display panel according to claim 13, further comprising a second initialization module and a storage module, wherein the second initialization module is configured to connect to a second initialization voltage and the control terminal of the drive module, and the storage module is connected between the control terminal of the drive module and a first power signal;

a control terminal of the data write module is configured to receive a second scan control signal, a control terminal of the second initialization voltage is configured to receive a third scan control signal, and a control terminal of the threshold compensation module is configured to receive a fourth scan control signal;

in the first display stage, the first scan control signal is used for controlling the first initialization module to be turned on, the second scan control signal is used for controlling the data write module to be turned on, the third scan control signal is used for controlling the second initialization module to be turned on, and the fourth scan control signal is used for controlling the threshold compensation module to be turned on; and in the second display stage, the first scan control signal is used for controlling the first initialization module to be turned on, and the second scan control signal is used for controlling the data write module to be turned on.

16. The display panel according to claim 1, wherein the display period of the display panel comprises the first display stage and N second display stages, a first initialization voltage in the first display stage is V1, and a first initialization voltage in each of the N second display stages is V2, wherein $|V1|<|V2|$.

17. The display panel according to claim 16, wherein a first one of the N second display stages is adjacent to the first display stage; and in an r-th second display stage of the N second display stages, the first initialization voltage is V21, and in an (r+1)-th second display stage of the N second display stages, the first initialization voltage is V22, wherein $|V21|<|V22|$, $1\le r\le N-1$, and r is an integer.

18. The display panel according to claim 17, wherein a difference between the first initialization voltage V1 in the first display stage and the first initialization voltage V2 in each of the N second display stages is a first difference S1, a difference between the first initialization voltage V21 in the r-th second display stage and the first initialization voltage V22 in the (r+1)-th second display stage is a second difference S2, and the first difference S1 is greater than or equal to the second difference S2.

19. A display device, comprising a display panel, wherein the display panel comprises:

at least one pixel circuit and at least one light-emitting element, wherein the at least one pixel circuit is configured to drive the at least one light-emitting element to emit light;

a pixel circuit of the at least one pixel circuit comprises a drive module and a light emission control module, the drive module is configured to generate a drive current, and the light emission control module is configured to control the drive current to be transmitted to a light-emitting element of the at least one light-emitting element in response to a light emission control signal; and a display period of the display panel comprises a first display stage and a second display stage;

in the first display stage, an ineffective pulse duration for the light emission control signal is T1; and in the second display stage, an ineffective pulse duration for the light emission control signal is T2; wherein T1>T2; and wherein the display panel further comprises a first initialization module, the first initialization module is configured to supply a first initialization voltage to a first node, the first node is connected to the light-emitting element, and a control terminal of the first initialization module is used for transmitting the first initialization voltage to the first node in response to a first scan control signal; and in the first display stage and the second display stage, a period of an effective pulse for the first scan control signal is located within a period of an ineffective pulse for the light emission control signal.

* * * * *